United States Patent
Akin et al.

(10) Patent No.: US 12,038,119 B2
(45) Date of Patent: Jul. 16, 2024

(54) SENSOR INTERFACE MODULE WITH SCISSOR LIFT FOR PLURALITY OF SENSORS, AND VISUAL INSPECTION MODULE WITH DUAL VIEW PATHS FOR ROBOT

(71) Applicants: GENERAL ELECTRIC COMPANY, Schenectady, NY (US); HIBOT CORPORATION, Tokyo (JP)

(72) Inventors: Selim Akin, Kocaeli (TR); Selami Haydar Icli, Baden, AG (CH); Christopher Paul Markman, Atlanta, GA (US); Brian William Graham, Schenectady, NY (US); Satoshi Kitano, Tokyo (JP); Salvatore Sessa, Tokyo (JP); Paulo Cesar Debenest, Tokyo (JP); Giacomo Cimarelli, Tokyo (JP)

(73) Assignee: GE Infrastructure Technology LLC, Greenville, SC (US)

( * ) Notice: Subject to any disclaimer, the term of this patent is extended or adjusted under 35 U.S.C. 154(b) by 181 days.

(21) Appl. No.: 17/753,123

(22) PCT Filed: Aug. 13, 2020

(86) PCT No.: PCT/US2020/046185
§ 371 (c)(1),
(2) Date: Feb. 18, 2022

(87) PCT Pub. No.: WO2021/034611
PCT Pub. Date: Feb. 25, 2021

(65) Prior Publication Data
US 2022/0397225 A1    Dec. 15, 2022

(30) Foreign Application Priority Data
Aug. 20, 2019    (EP) .................................... 19404002

(51) Int. Cl.
*F16L 55/40*    (2006.01)
*B25J 11/00*    (2006.01)
(Continued)

(52) U.S. Cl.
CPC ................ *F16L 55/40* (2013.01); *B66F 3/22* (2013.01); *H04N 23/54* (2023.01); *H04N 23/57* (2023.01); *F16L 2101/30* (2013.01)

(58) Field of Classification Search
None
See application file for complete search history.

(56) References Cited

U.S. PATENT DOCUMENTS

| 4,677,865 A | 7/1987 | Lehmann |
| 4,683,973 A | 8/1987 | Honjo et al. |

(Continued)

FOREIGN PATENT DOCUMENTS

| CH | 669127 A5 | 2/1989 |
| EP | 0171633 A1 | 2/1986 |

(Continued)

OTHER PUBLICATIONS

U.S. Appl. No. 15/652,859 Office Action dated Feb. 19, 2019, 17 pages.

(Continued)

*Primary Examiner* — Hung Q Dang
(74) *Attorney, Agent, or Firm* — James Pemrick; Charlotte Wilson; Hoffman Warnick LLC

(57) ABSTRACT

A sensor interface module for an inspection robot includes a scissor lift for varied radial positioning of, and a universal sensor mount for mounting, a selected one of a plurality of different sensors. A visual inspection module for the robot includes an inspection unit for simultaneously visually inspecting a first surface facing a first direction and a spaced, second surface facing an opposing, second direction toward (Continued)

the first surface. The inspection unit includes a first visual sensor and a second visual sensor, each visual sensor facing in a direction different than the first and second directions. A first reflector reflects an image of the first surface to the first visual sensor, and a second reflector reflects an image of the second surface to the second visual sensor. A robot system may include the sensor interface module and the inspection unit.

12 Claims, 26 Drawing Sheets

(51) Int. Cl.
*B25J 13/08* (2006.01)
*B25J 19/02* (2006.01)
*B66F 3/22* (2006.01)
*G01N 21/95* (2006.01)
*G01N 21/954* (2006.01)
*H04N 23/54* (2023.01)
*H04N 23/57* (2023.01)
*F16L 101/30* (2006.01)

(56) References Cited

U.S. PATENT DOCUMENTS

| | | | |
|---|---|---|---|
| 4,889,000 A * | 12/1989 | Jaafar | G01R 31/34 348/82 |
| 4,970,890 A | 11/1990 | Jaafar et al. | |
| 5,172,639 A | 12/1992 | Wiesman et al. | |
| 5,365,166 A * | 11/1994 | Dailey | F16L 55/26 324/545 |
| 5,481,929 A * | 1/1996 | Kohlert | G01R 31/34 73/866.5 |
| 5,650,579 A | 7/1997 | Hatley et al. | |
| 5,788,002 A | 8/1998 | Richter | |
| 5,947,051 A | 9/1999 | Geiger | |
| 5,969,531 A | 10/1999 | Murakami et al. | |
| 6,100,711 A | 8/2000 | Hatley | |
| 6,404,189 B2 | 6/2002 | Kwun et al. | |
| 6,672,413 B2 | 1/2004 | Moore et al. | |
| 6,814,169 B2 | 11/2004 | Moore et al. | |
| 6,876,222 B2 | 4/2005 | Fischer et al. | |
| 6,889,783 B1 | 5/2005 | Moore et al. | |
| 6,917,176 B2 | 7/2005 | Schempf et al. | |
| 6,959,603 B2 | 11/2005 | Knight et al. | |
| 7,188,568 B2 | 3/2007 | Stout | |
| 7,201,055 B1 | 4/2007 | Bagley et al. | |
| 7,218,993 B2 | 5/2007 | Yasukawa et al. | |
| 7,331,436 B1 | 2/2008 | Pack et al. | |
| 7,520,189 B2 | 4/2009 | Abbasi et al. | |
| 7,600,593 B2 | 10/2009 | Filippov et al. | |
| 7,617,732 B2 | 11/2009 | Bui et al. | |
| 7,624,827 B2 | 12/2009 | Moser et al. | |
| 7,654,348 B2 | 2/2010 | Ohm et al. | |
| 7,681,452 B2 | 3/2010 | Bagley et al. | |
| 7,743,675 B2 | 6/2010 | Moore | |
| 7,866,421 B2 | 1/2011 | Moore et al. | |
| 7,891,445 B1 | 2/2011 | McKinley et al. | |
| 8,028,775 B2 | 10/2011 | Orenbuch | |
| 8,220,345 B2 | 7/2012 | Moser et al. | |
| 8,477,891 B2 | 7/2013 | Wallace et al. | |
| 8,568,299 B2 | 10/2013 | Eno et al. | |
| 8,571,711 B2 | 10/2013 | Jacobsen et al. | |
| 8,619,134 B2 | 12/2013 | Christ | |
| 8,839,684 B2 | 9/2014 | Banowetz et al. | |
| 9,031,698 B2 | 5/2015 | Smith | |
| 9,056,746 B2 | 6/2015 | Mehrandezh et al. | |
| 9,217,852 B2 | 12/2015 | Baleine | |
| D748,053 S | 1/2016 | Herrlich et al. | |
| D756,922 S | 5/2016 | Herrlich et al. | |
| 9,398,198 B2 | 7/2016 | Choi et al. | |
| 9,409,292 B2 | 8/2016 | Smith et al. | |
| 9,683,460 B2 | 6/2017 | Moore et al. | |
| 9,708,934 B2 | 7/2017 | Moore et al. | |
| 9,759,667 B2 | 9/2017 | Miasnikov et al. | |
| 9,808,140 B2 | 11/2017 | Belson et al. | |
| 9,989,970 B1 | 6/2018 | Morey et al. | |
| 10,488,350 B2 | 11/2019 | Lakhani et al. | |
| 2002/0060267 A1 | 5/2002 | Yavnai | |
| 2002/0104693 A1 | 8/2002 | Moore et al. | |
| 2002/0190682 A1 | 12/2002 | Schempf et al. | |
| 2004/0020002 A1 | 2/2004 | Moore et al. | |
| 2004/0099175 A1 | 5/2004 | Perrot et al. | |
| 2004/0173116 A1 | 9/2004 | Ghorbel et al. | |
| 2005/0104600 A1 | 5/2005 | Cotton | |
| 2008/0087112 A1 * | 4/2008 | Bagley | G01N 29/265 322/99 |
| 2008/0098832 A1 | 5/2008 | Abbasi et al. | |
| 2008/0121041 A1 | 5/2008 | Smith et al. | |
| 2008/0179115 A1 | 7/2008 | Ohm et al. | |
| 2008/0195253 A1 | 8/2008 | Kim | |
| 2008/0308324 A1 | 12/2008 | Moser et al. | |
| 2009/0120215 A1 | 5/2009 | Jacobson et al. | |
| 2009/0146680 A1 | 6/2009 | Moser et al. | |
| 2009/0171151 A1 | 7/2009 | Choset et al. | |
| 2011/0040427 A1 | 2/2011 | Ben-Tzvi | |
| 2011/0175641 A1 * | 7/2011 | Wiesendanger | B62D 57/024 324/765.01 |
| 2012/0069172 A1 | 3/2012 | Hudritsch | |
| 2012/0205168 A1 | 8/2012 | Flynn et al. | |
| 2013/0231779 A1 | 9/2013 | Purkayastha et al. | |
| 2014/0022374 A1 | 1/2014 | Brignac et al. | |
| 2014/0067185 A1 | 3/2014 | Tralshawala et al. | |
| 2014/0216836 A1 | 8/2014 | Davies et al. | |
| 2014/0345384 A1 | 11/2014 | Nguyen | |
| 2015/0177156 A1 * | 6/2015 | Seo | G01N 21/8806 348/90 |
| 2015/0233787 A1 | 8/2015 | Eakins et al. | |
| 2015/0251318 A1 | 9/2015 | Lv | |
| 2015/0323469 A1 | 11/2015 | Clayton et al. | |
| 2016/0069813 A1 * | 3/2016 | Ritchey | G01N 21/8806 348/92 |
| 2016/0075020 A1 | 3/2016 | Szarski et al. | |
| 2016/0239080 A1 | 8/2016 | Marcolina et al. | |
| 2017/0219533 A1 | 8/2017 | Alford et al. | |
| 2017/0362068 A1 | 12/2017 | Cheng | |
| 2018/0021945 A1 | 1/2018 | Pettersen et al. | |
| 2018/0128879 A1 * | 5/2018 | Kuwahara | B25J 5/005 |
| 2018/0202944 A1 * | 7/2018 | Sanchez | G01N 21/954 |
| 2018/0313715 A1 | 11/2018 | Cichosz et al. | |
| 2019/0022848 A1 * | 1/2019 | Akin | B62D 55/00 |
| 2019/0022849 A1 | 1/2019 | Akin et al. | |
| 2019/0199179 A1 * | 6/2019 | Watanabe | B62D 55/075 |
| 2020/0064273 A1 * | 2/2020 | Jeong | G01N 21/8851 |

FOREIGN PATENT DOCUMENTS

| | | | |
|---|---|---|---|
| EP | 0390352 A2 | 10/1990 | |
| EP | 0684483 A2 | 11/1995 | |
| EP | 1772949 A1 | 4/2007 | |
| EP | 1863153 A2 | 12/2007 | |
| EP | 2345902 A1 | 7/2011 | |
| EP | 2743447 A1 | 6/2014 | |
| EP | 2886028 A1 | 6/2015 | |
| FR | 2355236 A1 | 1/1978 | |
| JP | 2002243649 A | 8/2002 | |
| JP | 2007256262 A | 10/2007 | |
| JP | 2016099135 A | 5/2016 | |
| KR | 101649319 B1 * | 8/2016 | F16L 55/26 |
| WO | 9702452 A1 | 1/1997 | |
| WO | 2008076193 A2 | 6/2008 | |
| WO | 2015095543 A1 | 6/2015 | |
| WO | 2016138529 A1 | 9/2016 | |
| WO | 2016141769 A1 | 9/2016 | |

OTHER PUBLICATIONS

International Search Report for corresponding PCT Application No. PCT/US2018/037900 dated Sep. 13, 2018, 14 pages.

(56) References Cited

OTHER PUBLICATIONS

International Search Report for corresponding PCT Application No. PCT/US2018/041726 dated Oct. 29, 2018, 18 pages.
U.S. Appl. No. 15/652,680 Office Action dated Mar. 18, 2019, 22 pages.
International Search Report for corresponding PCT Application No. PCT/US2018/035329 dated Sep. 11, 2018, 18 pages.
International Search Report for corresponding PCT Application No. PCT/US2018/038453 dated Oct. 25, 2018, 17 pages.
International Search Report for corresponding PCT Application No. PCT/US2018/040982 dated Oct. 17, 2018, 15 pages.
U.S. Appl. No. 15/652,730 Notice of Allowance dated May 3, 2019, 9 pages.
International Search Report for corresponding PCT Application No. PCT/DK96/00298 dated Oct. 17, 1996, 25 pages.
U.S. Appl. No. 15/652,680, Notice of Allowance dated Jul. 17, 2019, 8 pages.
U.S. Appl. No. 15/652,859, Notice of Allowance dated May 15, 2019, 10 pages.
U.S. Appl. No. 15/652,805, Office Action dated Jun. 27, 2019, 13 pages.
U.S. Appl. No. 15/652,771, Office Action dated Sep. 17, 2019, 12 pages.
U.S. Appl. No. 15/652,771, Notice of Allowance dated Jan. 24, 2020, 6 pages.
International Search Report for corresponding PCT Application No. PCT/US2020/046277 dated Nov. 11, 2020, 75 pages.
International Preliminary Report on Patentability for International Application No. PCT/US2020/046277 dated Mar. 3, 2022, 9 pages.
International Preliminary Report on Patentability for International Application No. PCT/US2020/046 dated Mar. 3, 2022, 9 pages.
U.S. Appl. No. 17/753,121, Non-Final Office Action dated Mar. 21, 2024, 25 pages.

\* cited by examiner

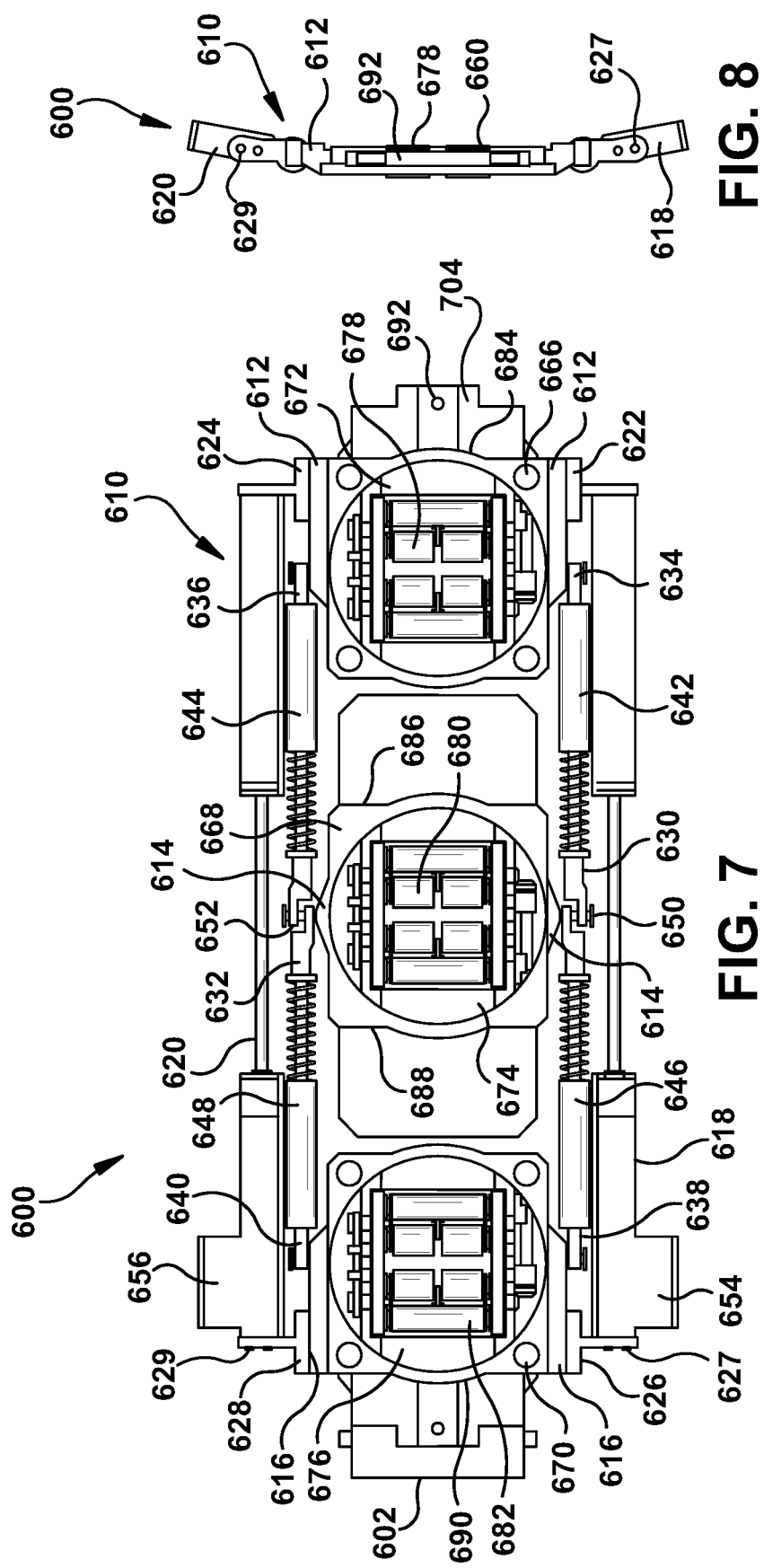

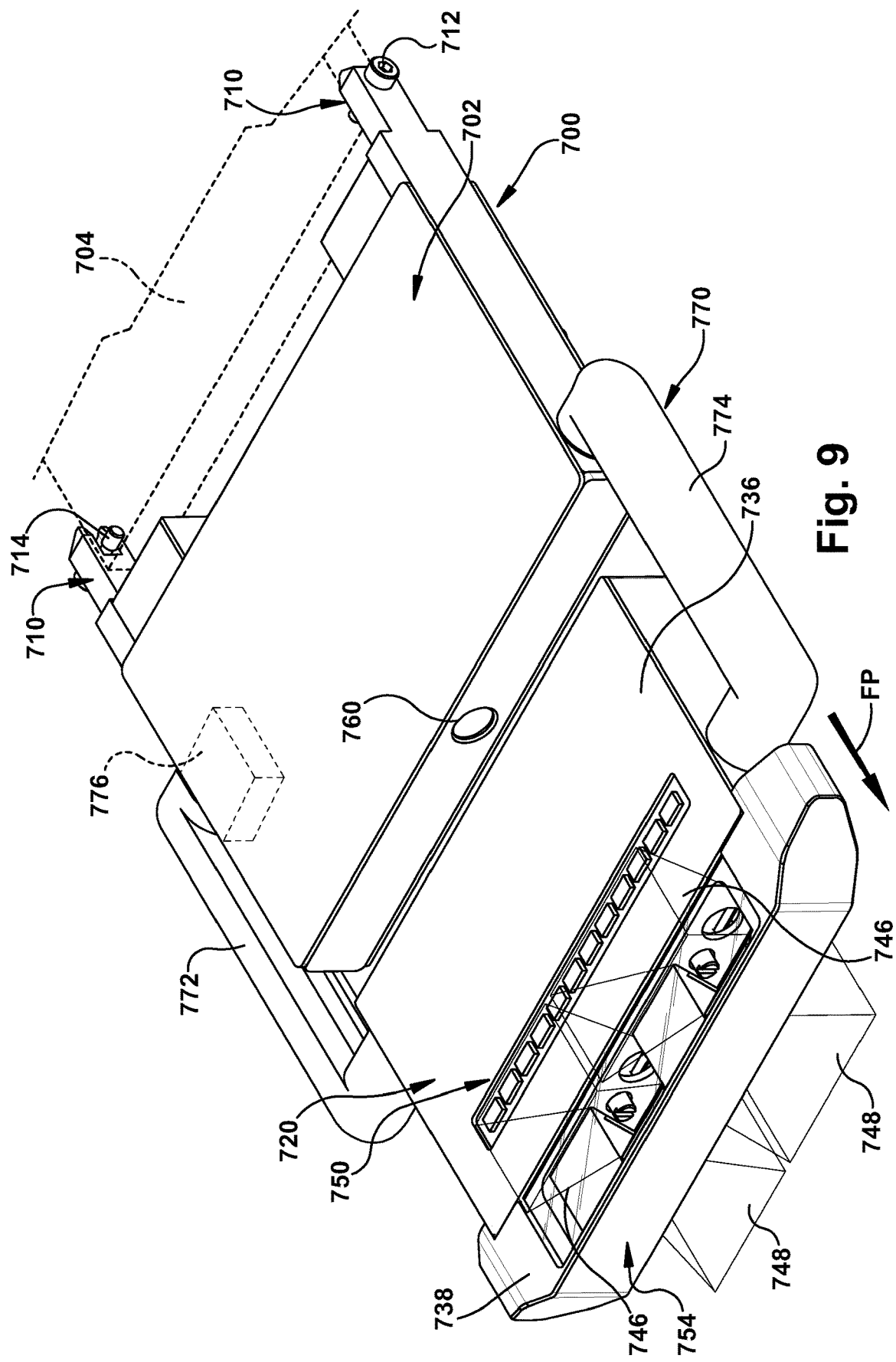

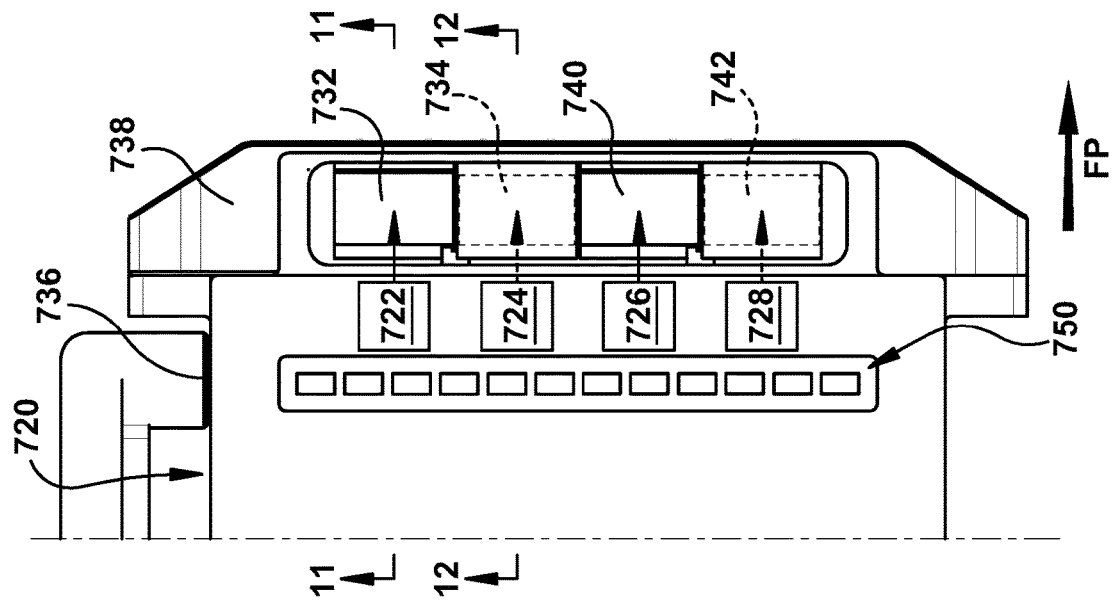

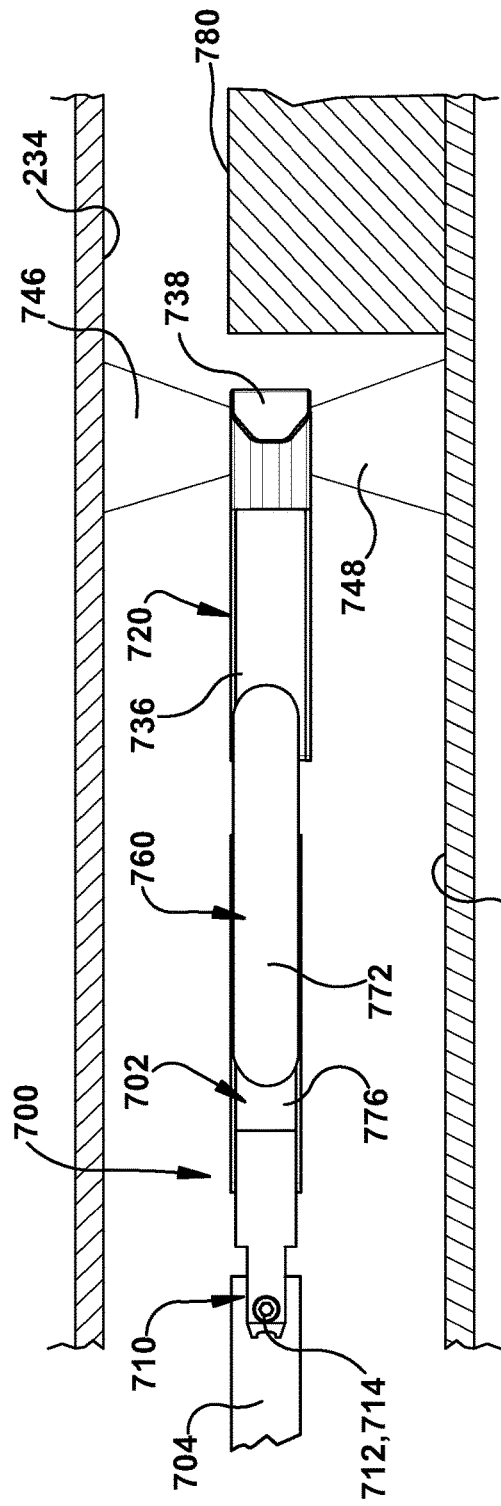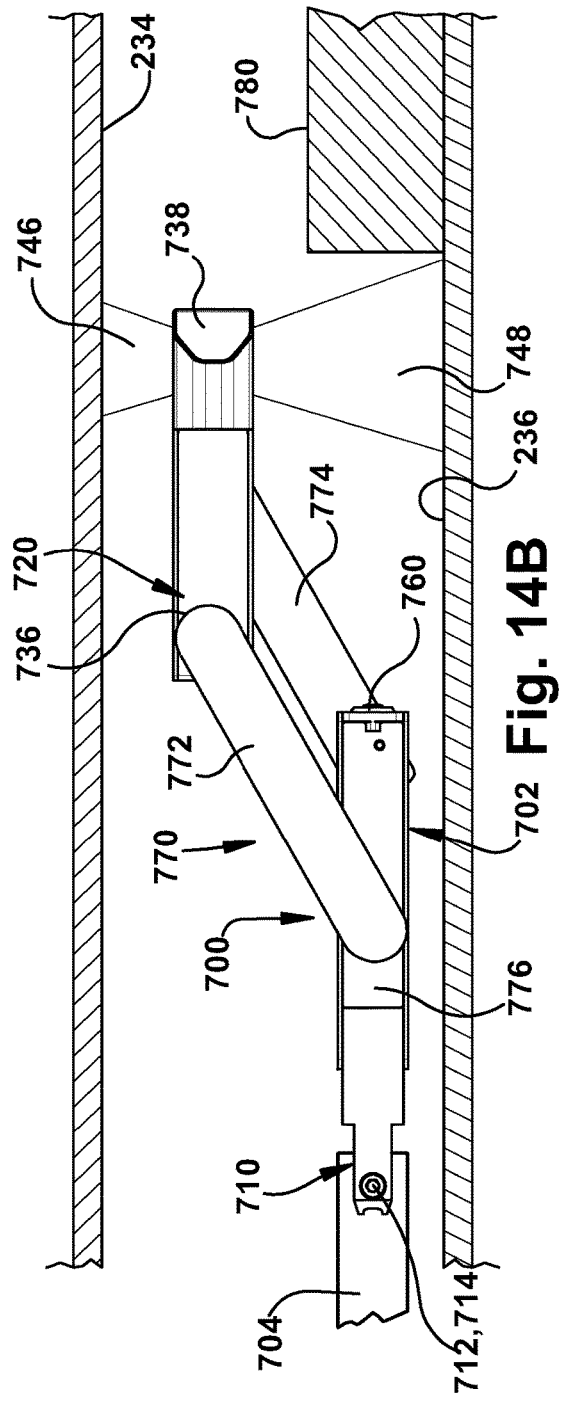

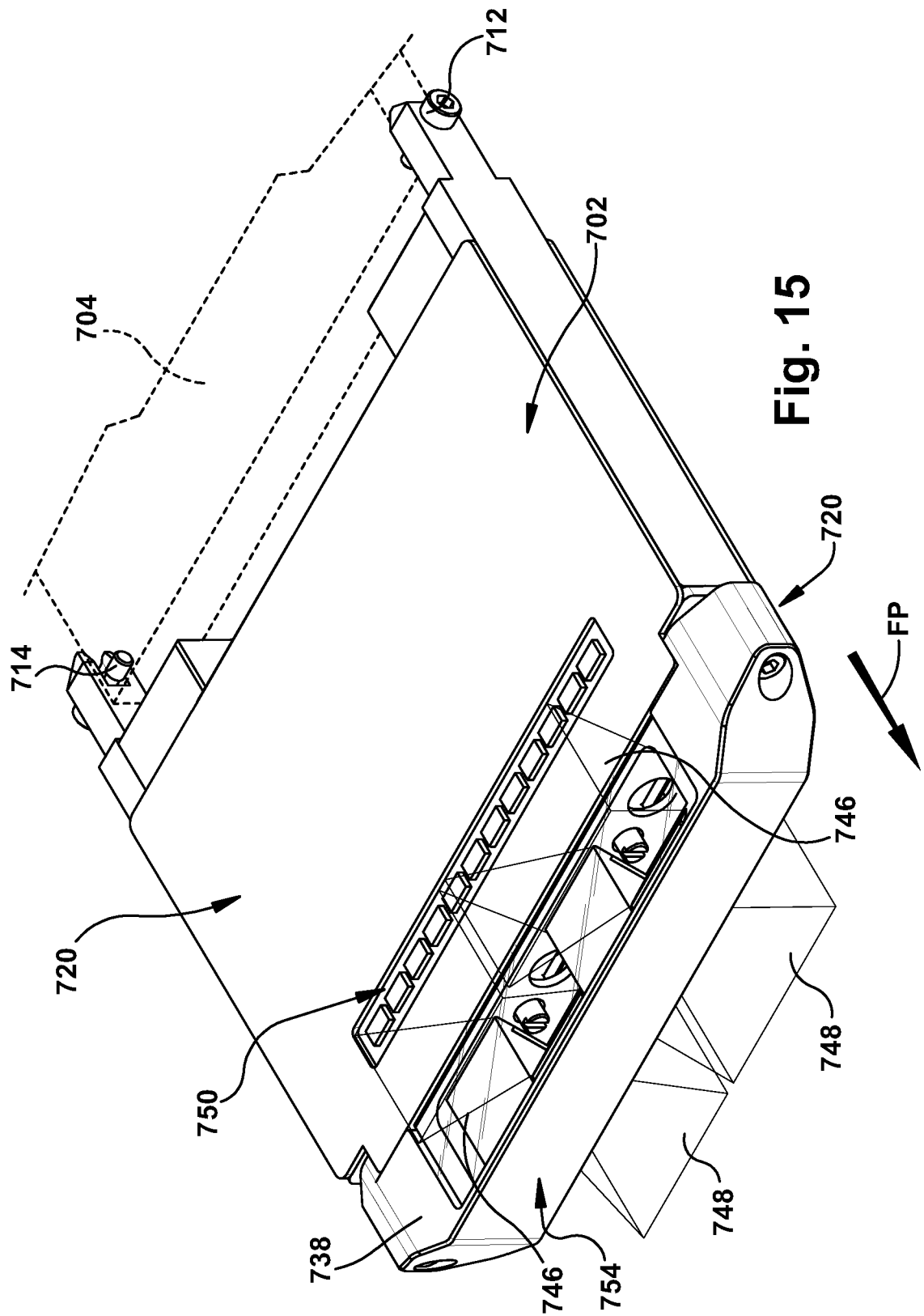

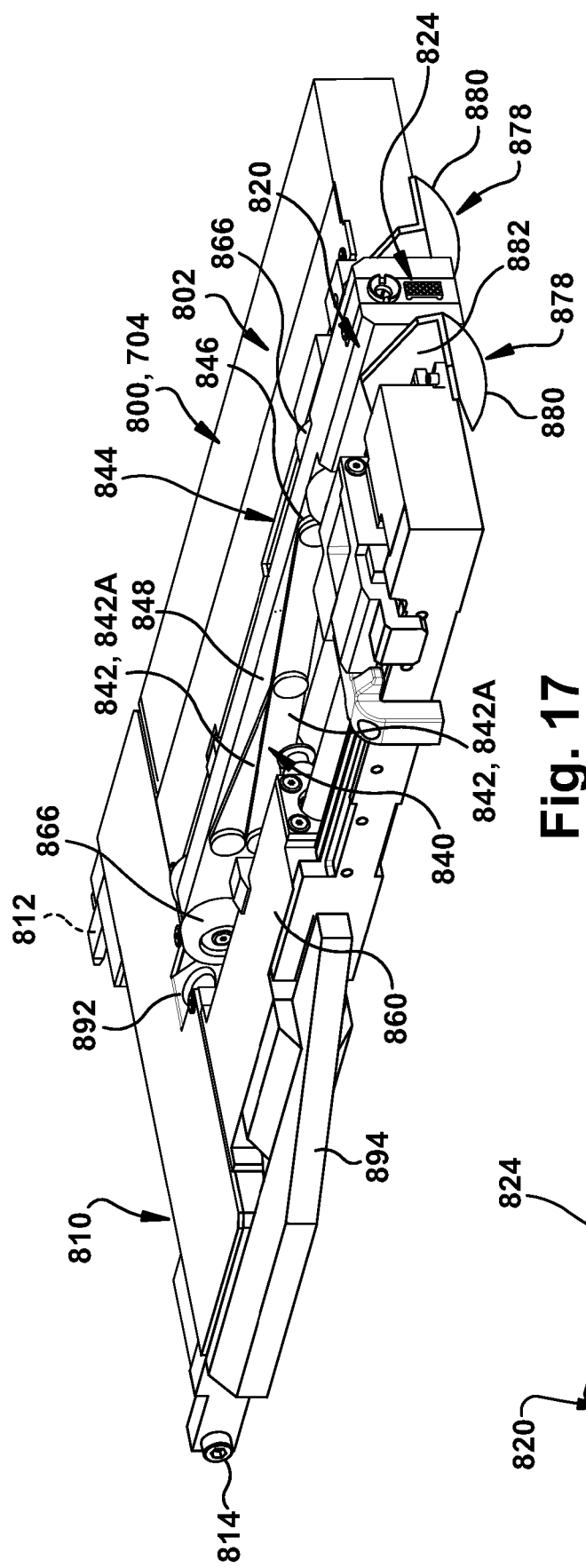
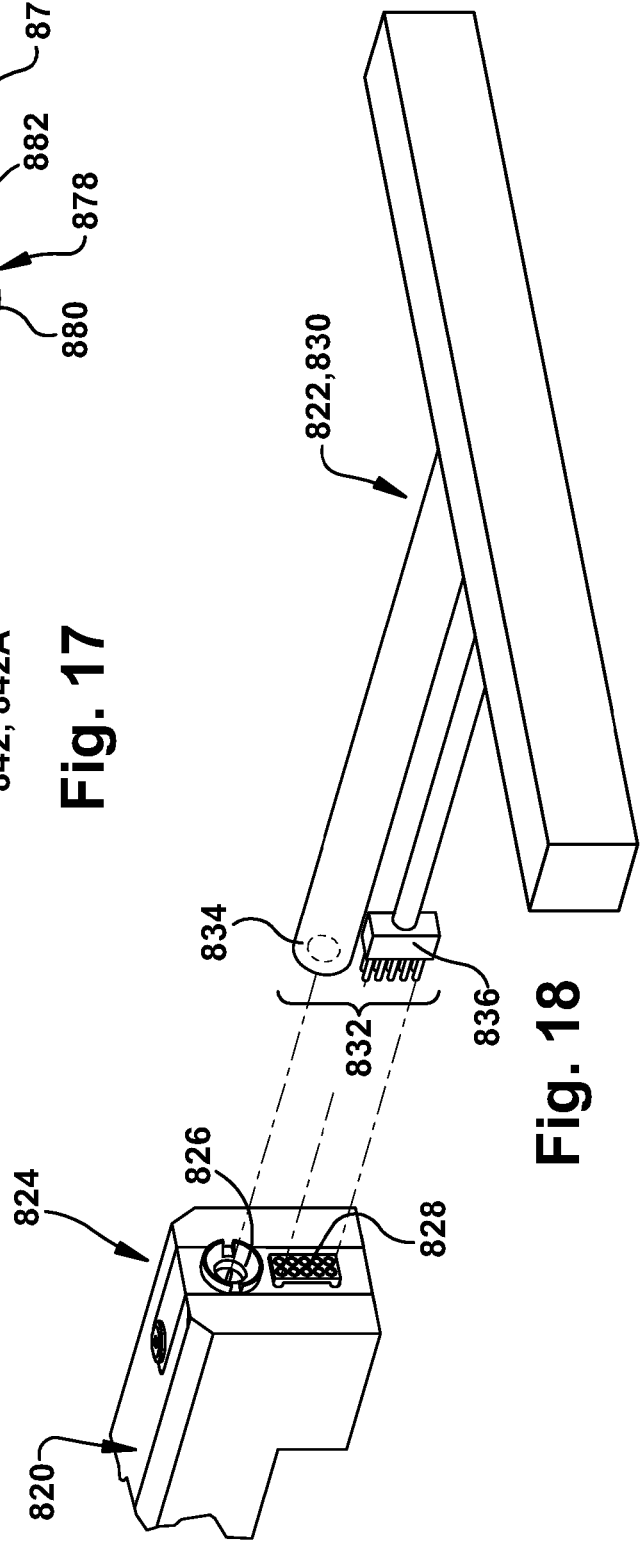
Fig. 17
Fig. 18

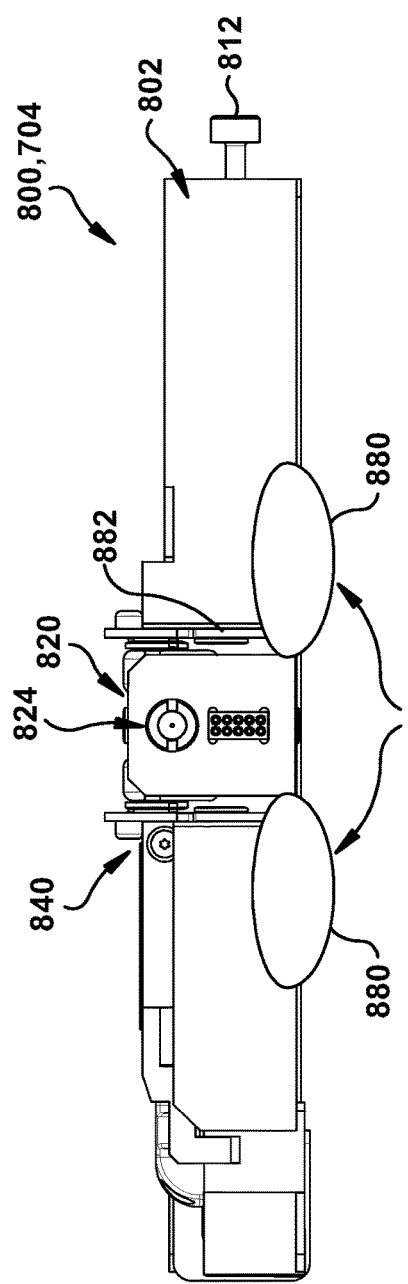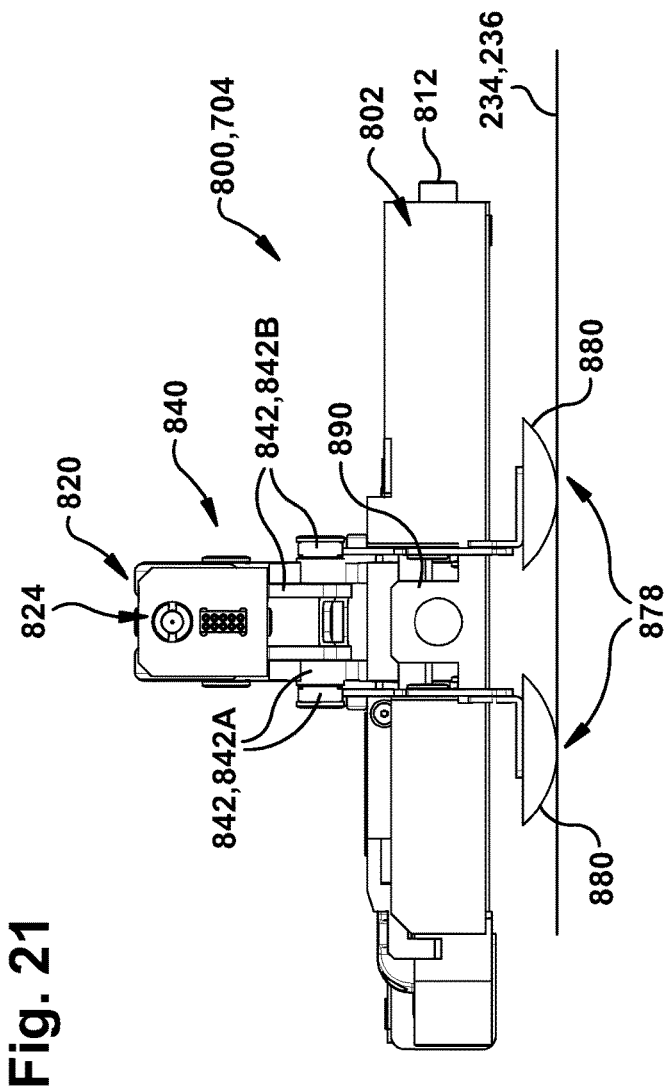

SENSOR INTERFACE MODULE WITH SCISSOR LIFT FOR PLURALITY OF SENSORS, AND VISUAL INSPECTION MODULE WITH DUAL VIEW PATHS FOR ROBOT

The disclosure is related to U.S. patent application Ser. No. 15/652,680, entitled "IN-SITU GAP INSPECTION ROBOT SYSTEM AND METHOD"; Ser. No. 15/652,730, entitled "MODULAR CRAWLER ROBOT FOR IN SITU GAP INSPECTION" filed Jul. 18, 2017; Ser. No. 15/652,771, entitled "END REGION INSPECTION MODULE AND METHOD FOR IN SITU GAP INSPECTION ROBOT SYSTEM" filed Jul. 18, 2017; Ser. No. 15/652,859, entitled "OMNIDIRECTIONAL TRACTION MODULE FOR A ROBOT" filed Jul. 18, 2017; Ser. No. 15/652,805, entitled "ACTUATED SENSOR MODULE AND METHOD FOR IN SITU GAP INSPECTION ROBOTS" filed Jul. 18, 2017. The entire contents of each of these related applications is hereby incorporated herein by reference.

The disclosure is also related to concurrently filed U.S. patent application Ser. No. 17/753,121, entitled "TRACTION MODULE FOR ROBOT WITH VARIABLE EXTENSION POSITIONS," filed 18 Feb. 2022.

BACKGROUND

The disclosure relates to robots for inspection of machinery and, more specifically, a sensor interface module that includes a scissor lift and a universal sensor mount for a plurality of different sensors, and a visual inspection module with dual view paths for inspecting two or more surfaces of a machine.

A visual and/or electrical inspection of a generator, electric motor, or turbomachine should be performed on a periodic basis. For example, generators may be inspected and tested periodically in the field for stator wedge tightness, visual surface anomalies, core imperfections, low flux, etc. Generator/stator inspection and testing procedures may require complete disassembly of the stator and removal of the generator rotor from the stator before any inspections or tests can be performed on the unit. The cost of disassembly and removal of the rotor, the time it takes for this process, and the dangers of rotor removal may impact the frequency of such inspections.

In situ inspection of generators have been performed employing poles, trolleys, scopes, and rotor turning techniques. These procedures may not accomplish the inspection task in a complete, timely, or safe manner.

Use of a robotic crawler capable of insertion through the radial air gap between the core iron and the retaining ring permits in situ inspection of the rotor and the stator core. The crawler may be inserted in a collapsed position into the gap and expanded, e.g., by electrical actuators, to the width of the air gap. The crawler may be remotely controlled by a technician and provides video visual sensors and other inspection tools to perform generator rotor and stator inspections within the air gap as the crawler is driven to selected locations. The crawler may be maneuvered by the technician within the air gap using video for both navigation and visual inspection.

Various sensors can be mounted to the robotic crawler for in situ inspection of the rotor and the stator core. One approach mounts a sensor to the robotic crawler with a parallelogram-type parallel lift. The parallelogram-type parallel lift can be inserted in a collapsed position into the gap and expanded to position a sensor in a parallel configuration relative to one or more of the surfaces of the annular gap. The sensor is mounted to an arm at the end of the parallelogram-type parallel lift, which does not provide the necessary resistance for certain types of tests such as a stator wedge impact testing. The parallelogram-type parallel lift also requires a certain amount of space in an axial direction in the collapsed state that is not necessary in the expanded state. Consequently, this type of sensor mount may be limited in application to where such space is present.

Another challenge relates to obtaining images of the rotor and stator core in an efficient manner. Current approaches employ one or more visual sensors aimed directly at the rotor and/or stator core. The visual sensors are limited in size and the optical focal distance.

BRIEF DESCRIPTION

A first aspect of this disclosure provides a visual inspection module for a robot, the visual inspection module comprising: a module housing; a mounting interface coupled to the module housing for mounting the module housing to a body frame of the robot; and an inspection unit for simultaneously visually inspecting a first surface facing a first direction and a spaced, second surface facing an opposing, second direction toward the first surface, the inspection unit including: a first visual sensor and a second visual sensor, each visual sensor facing in a third direction different than the first and second directions, a first reflector configured to reflect an image of the first surface to the first visual sensor, and a second reflector configured to reflect an image of the second surface to the second visual sensor.

A second aspect of the disclosure provides a sensor interface module for a robot, the module comprising: a module housing; a mounting interface coupled to the module housing for mounting the module housing to a body frame of the robot; a sensor mount including a common sensor connection port configured to connect a selected one of a plurality of different sensors to the sensor mount, each sensor including a connection member configured to mate with the common sensor connection port on the sensor mount; a scissor lift for maintaining the sensor mount substantially parallel to a first and second surfaces a first surface facing a first direction and a spaced, second surface facing an opposing, second direction toward the first surface; and a motorized transmission configured to move the scissor lift between an expanded position from the module housing, and a retracted position within the module housing.

A third aspect relates to a robot system, comprising: a robotic crawler; and a sensor interface module comprising: a module housing, a mounting interface coupled to the module housing for mounting the module housing to a body frame of the robot crawler, a sensor mount including a common sensor connection port configured to connect a selected one of a plurality of different sensors to the sensor mount, a scissor lift for maintaining the sensor mount substantially parallel to a first and second surfaces a first surface facing a first direction and a spaced, second surface facing an opposing, second direction toward the first surface, and a motor configured to move the scissor lift between an expanded position from the module housing, and a retracted position within the module housing; a visual inspection module operatively coupled to the sensor mount, the visual inspection module including: a connection member configured to mate with the common sensor connection port on the sensor mount, and an inspection unit for simultaneously visually inspecting a first surface facing a first direction and a spaced, second surface facing an opposing, second direction toward the first surface, the inspection unit including: a first visual sensor and a second visual sensor, each visual sensor facing in a third direction different than the first and second directions, a first reflector configured to reflect an image of the first surface to the first visual sensor, and a second reflector configured to reflect an image of the second surface to the second visual sensor; and a control system in communication with the robotic crawler, the sensor interface module and the inspection unit for controlling the robotic crawler, the sensor interface module and the inspection unit.

The illustrative aspects of the present disclosure are arranged to solve the problems herein described and/or other problems not discussed.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which:

FIG. 7 shows a top view of the robotic crawler of FIG. 6 in its collapsed state.

FIG. 8 shows an end view of the robotic crawler of FIG. 6 in its collapsed state.

FIG. 9 shows a perspective view of a visual inspection module according to various embodiments of the disclosure.

FIG. 10 shows a schematic cross-sectional view of a portion of the visual inspection module of FIG. 9.

FIGS. 14A-14B show side views of a visual inspection module in a flat position and a non-flat position, respectively, according to various embodiments of the disclosure.

FIG. 15 shows a perspective view of a visual inspection module according to an alternative embodiment of the disclosure.

FIG. 17 shows a perspective view of a sensor interface module in a retracted, flattened position according to various embodiments of the disclosure.

FIG. 18 shows an enlarged perspective view of a universal sensor connection port with an illustrative sensor according to various embodiments of the disclosure.

FIG. 21 shows a front view of a sensor interface module in a retracted, flattened position according to various embodiments of the disclosure.

FIG. 22 shows a front view of a sensor interface module in an expanded position according to various embodiments of the disclosure.

Figure 1:
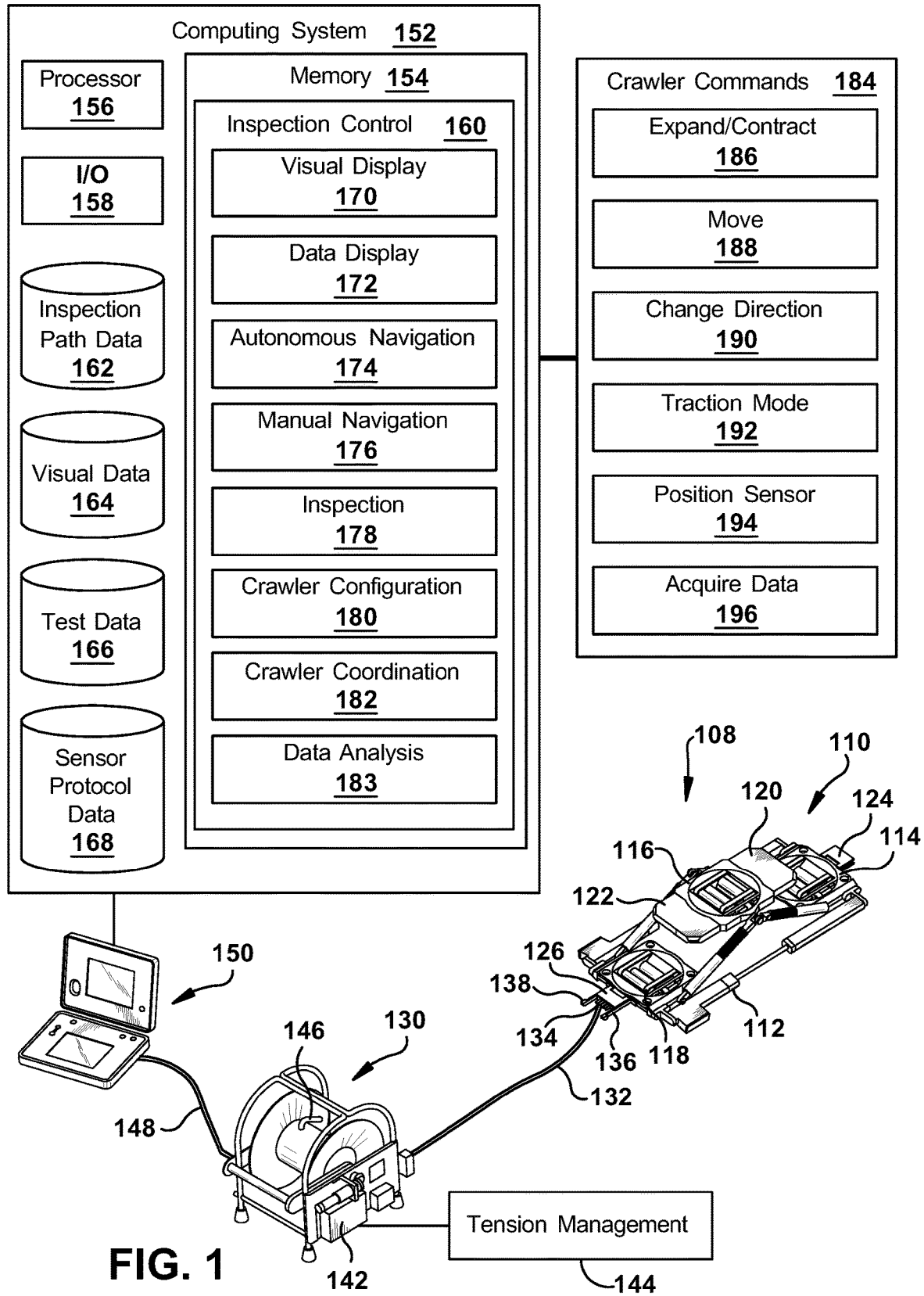
FIG. 1 shows a diagram of an example system for in situ gap inspection according to various embodiments of the disclosure.

It is noted that the drawings of the disclosure are not necessarily to scale. The drawings are intended to depict only typical aspects of the disclosure, and therefore should not be considered as limiting the scope of the disclosure. In the drawings, like numbering represents like elements between the drawings.

DETAILED DESCRIPTION

In the following description, reference is made to the accompanying drawings that form a part thereof, and in which is shown by way of illustration specific exemplary embodiments in which the present teachings may be practiced. These embodiments are described in sufficient detail to enable those skilled in the art to practice the present teachings and it is to be understood that other embodiments may be used and that changes may be made without departing from the scope of the present teachings. The following description is, therefore, merely illustrative.

In addition, several descriptive terms may be used regularly herein, and it should prove helpful to define these terms at the onset of this section. These terms and their definitions, unless stated otherwise, are as follows. It is often required to describe parts that are at differing circumferential positions with regard to a center axis. The term "radial" refers to movement or position perpendicular to an axis, e.g., an axis of the machine. In cases such as this, if a first component resides closer to the axis than a second component, it will be stated herein that the first component is "radially inward" or "inboard" of the second component. If, on the other hand, the first component resides further from the axis than the second component, it may be stated herein that the first component is "radially outward" or "outboard" of the second component. The term "axial" refers to movement or position parallel to an axis, e.g., the rotor axis of the machine. Finally, the term "circumferential" refers to movement or position around the axis. It will be appreciated that such terms may be applied in relation to the center axis of variety of machine configurations, e.g., of generators, electric motors, or turbomachines.

In addition, several descriptive terms may be used regularly herein, as described below. The terms "first", "second", and "third" may be used interchangeably to distinguish one component from another and are not intended to signify location or importance of the individual components.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. "Optional" or "optionally" means that the subsequently described event or circumstance may or may not occur, and that the description includes instances where the event occurs and instances where it does not.

Where an element or layer is referred to as being "on," "engaged to," "disengaged from," "connected to" or "coupled to" another element or layer, it may be directly on, engaged, connected or coupled to the other element or layer, or intervening elements or layers may be present. In contrast, when an element is referred to as being "directly on," "directly engaged to," "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Embodiments of the disclosure provide a visual inspection module for a robot and a robot system using the visual inspection module. The robot may take a variety of forms such as a robotic crawler. Use of a robot employing a robotic crawler capable of insertion through the annular gap in a machine such as a generator, e.g., between the core iron and the retaining ring, permits in situ inspection of the machine parts such as the rotor and the stator core. The robotic crawler may be inserted in a collapsed position into the annular gap and expanded to the width of the air gap. One or more traction modules may drive movement of the robotic crawler. The crawler may be remotely controlled by a technician and provides video visual sensors and other inspection tools to perform generator rotor and stator inspections within the annular gap as the robotic crawler is driven to selected locations. The crawler may be maneuvered by the technician within the annular gap using video for both navigation and visual inspection. The visual inspection module includes a module housing; and a mounting interface coupled to the module housing for mounting the module housing to a body frame of the robot. An inspection unit simultaneously visually inspects a first surface facing a first direction and a spaced, second surface facing an opposing, second direction toward the first surface. The inspection unit includes a first visual sensor and a second visual sensor, each visual sensor facing in a third direction different than the first and second directions, a first reflector reflects an image of the first surface to the first visual sensor, and a second reflector reflects an image of the second surface to the second visual sensor. The visual sensors with reflectors allow for use of larger visual sensors that have increased optical focal distance, thus providing better resolution and lower distortion of the images. Images can be stitched together.

Referring to FIG. 1, an example robot system 100 for in situ gap inspection is shown. Robot system 100 may include a robot 108, such as a robotic crawler 110, a tether reel 130, and a control system 150. Robotic crawler 110 may be configured to be inserted through an entrance gap into an annular gap in a machine to conduct autonomous or semi-autonomous inspection of the machine. For example, robotic crawler 110 may be a collapsible robot that can operate in a collapsed or expanded state and may be inserted through a narrow entrance gap in its collapsed state and expand to a wider gap width such that it engages the opposed surfaces of the annular gap. Robotic crawler 110 is shown in its expanded state in FIG. 1. Once in the annular gap, robotic crawler 110 may navigate the annular gap and use one or more sensor modules to conduct various inspection tests during its movements or at various desired crawler positions in the annular gap. Robotic crawler 110 may be configured for multidirectional movement, including forward and reverse movement in the axial direction and bi-directional lateral movement in the circumferential direction. In some embodiments, robotic crawler 110 may be configured for omnidirectional movement that includes bi-directional movement in any orientation between the axial and circumferential directions, in addition to the axial and circumferential directions. For example, robotic crawler 110 may be configured to move in any direction in a 360 degree arc and freely change its direction of travel to any orientation in the 360 degree arc, including a plurality of directions between and angled from the axial and circumferential directions. In some embodiments, robotic crawler 110 may include a tether 132 connected to robotic crawler 110 and extending out of the machine during operation. For example, tether 132 may be a cable connected to robotic crawler 110 to enable retrieval of robotic crawler 110 in the event that robotic crawler 110 cannot navigate out of the annular gap under its own power. In some embodiments, tether 132 may provide a physical connection from robotic crawler 110 for a wired communication channel and/or a remote power source and/or pneumatic or hydraulic lines to support test systems or robotic operation. Tether reel 130 may be automated to adjust the tension and/or slack on tether 132 during operation of robotic crawler 110 within the annular gap, enabling robotic crawler 110 to navigate various navigation paths and perform inspection routines without a user manually managing the position of the tether. Control system 150 may be in communication with robotic crawler 110 to provide control signals to robotic crawler 110 and receive sensor, navigation, and/or other operational data from robotic crawler 110. In some embodiments, control system 150 may be electrically connected to tether 132 directly or through tether reel 130 and the electrical connection may include one or both of a power channel and a communication channel. Control system 150 may provide a user interface for a user to monitor, evaluate, supplement, and/or control robotic crawler 110 during an inspection deployment within the annular gap of the machine.

In some embodiments, robotic crawler 110 is a modular robot that may be reconfigured for different inspection tasks and enabling efficient maintenance, replacement, and/or upgrade of individual modules. Robotic crawler 110 may include a body frame, such as an expandable body 112, for navigating an annular gap in a generator, electric motor, or turbomachine. Expandable body 112 may receive, position, and connect various modules relative to one another. In some embodiments, expandable body 112 accommodates a plurality of traction modules 114, 116, 118. For example, robotic crawler 110 may include three traction modules 114, 116, 118, a forward traction module 114, a middle traction module 116, and a rear traction module 118, where forward traction module 114 and rear traction module 118 are configured to engage a first surface in the annular gap and the middle traction module 116 is configured to engage an opposed second surface in the annular gap. Traction modules 114, 116, 118 may be multidirectional traction modules capable of moving robotic crawler 110 in multiple directions, including both axial and circumferential movement within the annular gap. Robotic crawler 110 may further include a plurality of sensor modules 120, 122, such as visual sensors for navigation, obstacle avoidance and/or visual inspection. In terms of visual inspection, sensor modules 120, 122 may be used with or without visual inspection module 700 (see e.g., FIG. 13), described herein. For example, sensor modules 120, 122 may be attached via sensor interfaces on the body frame to the forward and rear sides of middle traction module 116 and may provide both forward and rear facing navigation cameras, as well as one or more upward facing visual sensors for inspecting the adjacent surface of the annular gap. Robotic crawler 110 may also include one or more tether connectors 124, 126 for detachably receiving tether 132, generally with a compatible end connector 134 and fasteners 136, 138.

In some embodiments, tether reel 130 is an automated tether reel that may receive, release, and spool tether 132 to adjust tension as needed during operation of robotic crawler 110. For example, tether reel 130 may include a servo motor 142 and tension management logic 144. For example, servo motor 142 operating in a torque/current control mode may detect changes in tension on tether 132 as it enters tether reel 130 and tension management logic 144 may provide an algorithm for maintaining an acceptable tension range using servo motor 142 to reel in or reel out tether 132 under closed loop control. In some embodiments, tether 132 may have a fixed connection 146 to tether reel 130 and a separate wire 148 may connect to control system 150. For example, wire 148 may provide communication and/or power channels without providing the mechanical characteristics desired for tethering robotic crawler 110. In some embodiments, tether reel 130 may provide an interface for receiving control signals for tether reel 130 from control system 150. For example, control system 150 may be able to adjust tension control or motor parameters and/or manually override operation of tether reel 130. In some embodiments, robotic crawler 110 may operate without a tether, carry its own power (e.g., batteries), and/or use wireless communication with control system 150.

In some embodiments, control system 150 may include a computing system 152. Computing system 152 may provide a plurality of programmatic controls and user interface(s) for operating robotic crawler 110. In some embodiments, computing system 152 is a general purpose computing device, such as a personal computer, work station, mobile device, or an embedded system in an industrial control system (using general purpose computing components and operating systems). In some embodiments, computing system 152 may be a specialized data processing system for the task of controlling operation of robot system 100. Computing system 152 may include at least one memory 154, processor 156, and input/output (I/O) interface 158 interconnected by a bus. Further, computing system 152 may include communication with external I/O device/resources and/or storage systems, including connected system, such as robotic crawler 110, tether reel 130, and network resources. In general, processor 156 executes computer program code, such as inspection control module 160, that is stored in memory 154 and/or a storage system. While executing computer program code, processor 156 can read and/or write data to/from memory 154, storage systems, and I/O devices (through I/O interface 158). The bus provides a communication link between each of the components within computing system 152. I/O devices may comprise any device that enables a user to interact with computing system 152 (e.g., keyboard, pointing device, display, etc.). Computing system 152 is only representative of various possible combinations of hardware and software. For example, the processor may comprise a single processing unit, or be distributed across one or more processing units in one or more locations, e.g., on a client and server. Similarly, memory and/or storage systems may reside at one or more physical locations. Memory and/or storage systems can comprise any combination of various types of non-transitory computer readable storage medium including magnetic media, optical media, random access memory (RAM), read only memory (ROM), etc. In some embodiments, computing system 152 is a laptop computer in communication with robotic crawler 110 via a wired (serial, USB, Ethernet, etc.) or wireless (802.11, Bluetooth, etc.) connection and running application software for robot system 100. In some embodiments, some or all of the functions of computing system 152 may be on board robotic crawler 110 using an integrated computing system, such as an on board control module, with or without wireless communication to one or more user interfaces and/or remote data storage.

In some embodiments, computing system 152 may include one or more application programs, data sources, and/or functional modules for controlling robotic crawler 110. For example, computing system 152 may include inspection control module 160 that operates in conjunction with data sources 162, 164, 166, 168 to provide control signals to and receive data from robotic crawler 110. Inspection control module 160 may provide a visual display module 170. For example, visual data collected by visual sensors on robotic crawler 110 may be displayed by visual display module 170, such as a graphical user interface for one or more video feeds. In some embodiments, visual data from robotic crawler 110 may be stored in visual data source 164 for use by visual display module 170 and/or selective, temporary, and/or archival storage of visual data for later use, including use by other users or systems. Data display module 172 may provide display, including visual display, of other test data, including processed visual data and resulting calculations or analysis. For example, data display module 172 may include a graphical user interface for test results from one or more test protocols using sensor and navigation data from robotic crawler 110. In some embodiments, test data from robotic crawler 110 may be stored in test data source 166 for use by data display module 172 and/or selective, temporary, and/or archival storage of test data for later use, including use by other users or systems. Data display module 172 may include a real-time display of test data as it is collected by robotic crawler 110 and/or one or more functions for viewing, aggregating, analyzing, visualizing, selecting, and/or reporting test data from test data source 166. Autonomous navigation module 174 may provide a protocol or series of commands for navigation of robotic crawler 110 within the annular gap of the machine. In some embodiments, autonomous navigation module 174 enables a user to select an inspection path from a plurality of inspection paths stored in inspection path data source 162. For example, inspection paths may be defined as physical paths robotic crawler 110 should follow within the annular gap to complete one or more inspection tasks in one or more locations within the annular gap. Inspection paths may be based on a physical schematic or parameters of one or more machines defining axial and circumferential distances. Inspection paths may also include parameters and locations related to specific features of interest for either navigation (e.g., surface features to be avoided) or for testing (e.g., locations or corresponding crawler positions for conducting specific tests). In some embodiments, inspection paths may be stored and defined in terms of a sequence of crawler commands.

Autonomous navigation module 174 may enable autonomous navigation by robotic crawler 110 receiving and executing a sequence of crawler commands without user intervention once the autonomous operation is initiated. In some embodiments, autonomous navigation module 174 may have completely autonomous inspection routines that require no user intervention once initiated or may include a plurality of inspection subroutines, such as specific movement patterns, position changes, or test protocols, that are initiated in a desired sequence by a user, potentially based on navigational, visual, or test data feedback. Manual navigation module 176 may provide a user with the ability to pilot or otherwise control robotic crawler 110. In some embodiments, manual navigation module 176 may be provided for establishing an initial position for initiating automated control and/or allow a user to override automated control in response to problems, exceptions, or specific test protocols (such as an initial test result that requires further data gathering). In some embodiments, control system 150 may include one or more user I/O interfaces for manually controlling robotic crawler 110, such as joysticks and other tactile controls, for navigation, deploying sensors, and conducting various test protocols.

Inspection module 178 may provide a plurality of routines for various inspection protocols using one or more sensor modules. In some embodiments, one or more sensor protocols are stored in sensor protocol data source 168 for use by inspection module 178. For example, a visual inspection protocol may include activating and capturing visual data from one or more sensor modules 120, 122 and/or a visual inspection module 700 (see e.g., FIG. 13) on robotic crawler 110 along a defined navigation path to enable mapping of captured visual data to location information with the machine. In some embodiments, a plurality of visual sensors with varying facings and/or positionable visual sensors may be present in one or more sensor modules 120, 122 and visual inspection module 700 (see e.g., FIG. 13) may include selective activation and positioning of robotic crawler 110 and its various visual sensors. An inspection protocol executed by inspection module 178 may include a combination of navigational elements (navigation path, autonomous positioning, and/or manual positioning) and sensor protocols (position requirements, deployment, activation, timing/sampling, parameters, etc.). In some embodiments, inspection module 178 may define the storage of visual data and test data in visual data source 164 and test data source 166 and/or the display of visual data by visual display module 170 and test data by data display module 172.

Crawler configuration module 180 may provide data regarding the configuration of modules and related capabilities and protocols for any given configuration of robotic crawler 110. In some embodiments, crawler configuration module 180 may map crawler configurations to machine specifications and sensor protocols to assist a user in matching inspection protocols with the resources available for a given test deployment. For example, a given configuration of sensor modules may define the test capabilities of robotic crawler 110 and recommend specific inspection protocols to utilize those sensor modules. In some embodiments, crawler configuration module 180 may include a library of sensor modules and related capabilities and support user reconfiguration of robotic crawler 110 for a desired inspection protocol. Crawler configuration module 180 may also define the set of crawler commands 184 that may be used to control robotic crawler 110. Crawler coordination module 182 may enable inspection control module 160 to control more than one robotic crawler 110 simultaneously. In some embodiments, crawler coordination module 182 may maintain a plurality of communication channels for control signals and data signals with a plurality of robotic crawlers. For example, crawler coordination module 182 may manage a plurality of instances of visual display module 170, data display module 172, autonomous navigation module 174, manual navigation module 176, inspection module 178, and crawler configuration module 180 for parallel management of the plurality of robotic crawlers. In some embodiments, crawler coordination module 182 may include interference protection for tracking the current crawler positions, navigation paths, and timing of various movements and sensor protocols to prevent collisions or other interference within the annular gap. Data analysis module 183 may provide any variety of analysis tools to evaluate or manipulate inspection path data 162, visual data 164, test date 166, and/or sensor protocol data 168. For example, data analysis module 183 may include a stitching algorithm to stitch images of surfaces 234, 236 (FIG. 3) obtained by different visual sensors together to provide a two dimensional rendering of the surfaces.

In some embodiments, visual display module 170, data display module 172, autonomous navigation module 174, manual navigation module 176, and inspection module 178 may be configured to issue one or more crawler commands 184 to robotic crawler 110 to complete some aspect of their function. Crawler commands 184 may then be translated into messages or control signals from control system 150 to robotic crawler 110. In some embodiments, crawler configuration module 180 may define the set of crawler commands available to the other modules based on the configuration of robotic crawler 110. An example set of crawler commands 184 are provided, but will be understood to be neither exclusive nor exhaustive of the possible crawler commands that could be used to control robotic crawler 110 and various configurations of traction modules, sensor modules, and body frame mechanics possible. Robotic crawler 110 may receive expand/contract commands 186 to expand or contract expandable body 112 between a collapsed state and one or more expanded states, such as a control signal to one or more motors that drive the body position. In some embodiments, expand or contract may be based on feedback from sensors within robotic crawler 110 when the traction modules are in a planar position (for collapsed state) or have contacted opposed surfaces in the annular gap (for expanded state). In other embodiments, expand or contract may be based on time (e.g., activate motor for x seconds of expansion or contraction) or distance (e.g., set crawler width to y centimeters). Robotic crawler 110 may receive move commands 188 to drive its traction modules forward or backwards (based on the present alignment of the traction modules in the case of multidirectional traction modules). Robotic crawler 110 may receive change direction commands 190 to reorient its traction modules and direction of travel. For example, change direction commands 190 may allow multidirectional traction modules to rotate 90 degrees and change from axial orientation and directions of travel to circumferential orientation and directions of travel. In some embodiments, change direction commands 190 may include orientation changes of greater or less than 90 degrees and include a feedback signal for confirming orientation of traction modules and communicating orientation back to control system 150. Robotic crawler 110 may receive traction mode commands 192 to drive changes in the configuration of the traction modules for different traction modes. For example, traction modules may include a flat mode for robot insertion and/or low profile and smooth surface travel and a clearance mode for providing clearance between the body of robotic crawler 110 and the surfaces it is moving along and/or traversing obstacles or uneven surfaces. Traction mode commands 192 may include control signals to change one or more traction modules 114, 116, 118 from a flat mode to a clearance mode or from the clearance mode to the flat mode. Robotic crawler 110 may receive position sensor commands 194 for sensor modules that include deployment and/or positioning features. For example, some sensor modules may include electromechanical features for extending, raising, lowering, rotating, or otherwise positioning one or more elements of the sensor module before, during, or after data collection. Position sensor commands 194 may include a control signal to activate a motor for extending or otherwise repositioning a sensor from robotic crawler 110 to position it for data collection or for moving a sensor (such as by rotation) independent of changing crawler position during data collection. Robotic crawler 110 may receive acquire data commands 196 for initiating data collection through a sensor module using whatever modality is present in that sensor module. Acquire data commands 196 may provide a start or stop signal for a continuous data collection mode, such as a video feed from the visual sensor(s) of a visual sensor, or a specific test sequence for a more discrete sensor test, such as a mechanical wedge tightness test. It will be understood that some robotic crawlers and control systems may be able to communicate and manage multiple commands in parallel, as overlapping sequences, or as serial command series. Crawler coordination module 182 may enable control system 150 to issue commands to and acquire data from multiple robotic crawlers in parallel.

Figure 2:
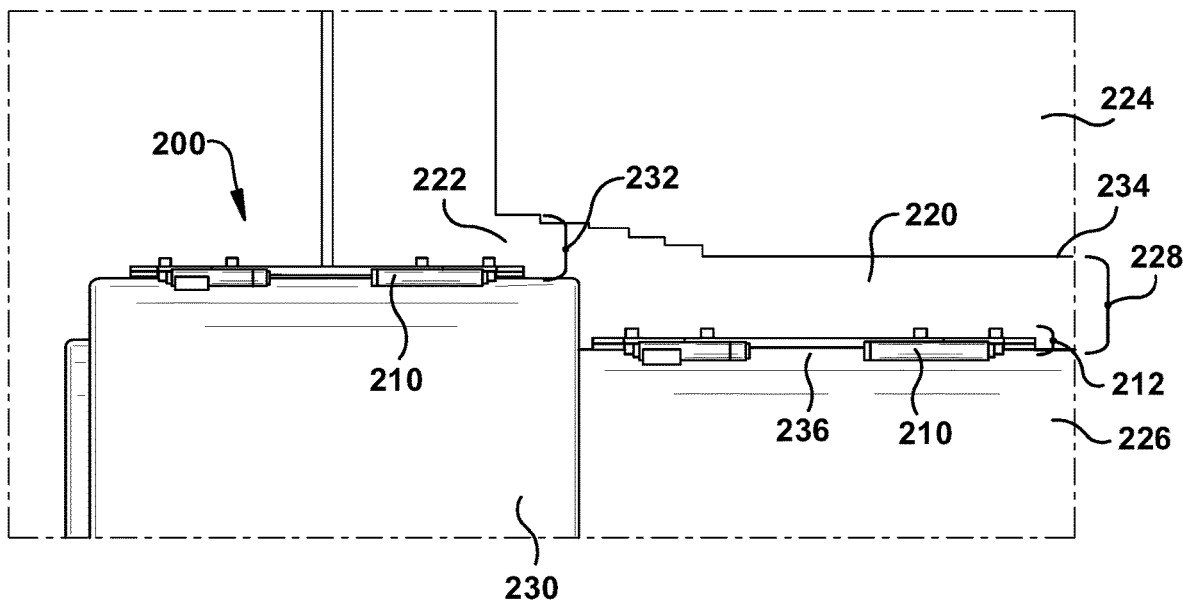
FIG. 2 shows a side section view of gap insertion of a robotic crawler into a machine.

Referring to FIG. 2, an in situ gap inspection system 200 is shown with a robotic crawler 210, such as robotic crawler 110 in FIG. 1, being inserted into the machine. The machine may be any machine including an annular gap 220 accessible through an entrance gap 222 and, more specifically, a variety of machine configurations of generators, electric motors, or turbomachines. For example, a generator may allow insertion through the annular gap between the core iron and the retaining ring, which permits in situ inspection of the rotor and the stator core. Annular gap 220 may be defined between a cylindrical central member 226 and a surrounding cylindrical member 224 with generally complementary curvature. In some embodiments, annular gap 220 may be an air gap generally defined between the inner diameter of the stator and the outer diameter of the rotor. Annular gap 220 has an axial length from a first end to a second end of cylindrical central member 226 and a circumference measured in the direction of the circumference of cylindrical central member 226. Annular gap 220 has an annular gap width 228 measured from outer surface 236 of cylindrical central member 226 to the nearest opposite surface (inner surface 234) of surrounding cylindrical member 224. Annular gap width 228 may vary circumferentially and/or axially. In some embodiments, entrance gap 222 may be an air gap at an end of the cylindrical central member 226 and have the same entrance width as annular gap width 228. In other embodiments, entrance gap 222 may include additional features, such as a retaining member 230, that further constrain entrance gap 222 and define an entrance gap width 232 is that is less than annular gap width 228. In some embodiments, additional features or obstacles may reduce annular gap width 228, such as entrance baffles used to direct cooling air flow.

In FIG. 2, robotic crawler 210 is in a collapsed state, where its traction modules are aligned in a single plane. Robotic crawler 210 is shown outside entrance gap 222 before insertion and inside annular gap 220 after insertion. Robotic crawler 210 may define a collapsed crawler width 212. Collapsed crawler width 212 may be less than both entrance gap width 232 and annular gap width 228. In its collapsed state, robotic crawler 210 engages only outer surface 236 of cylindrical central member 226 inside annular gap 220.

Figure 3:
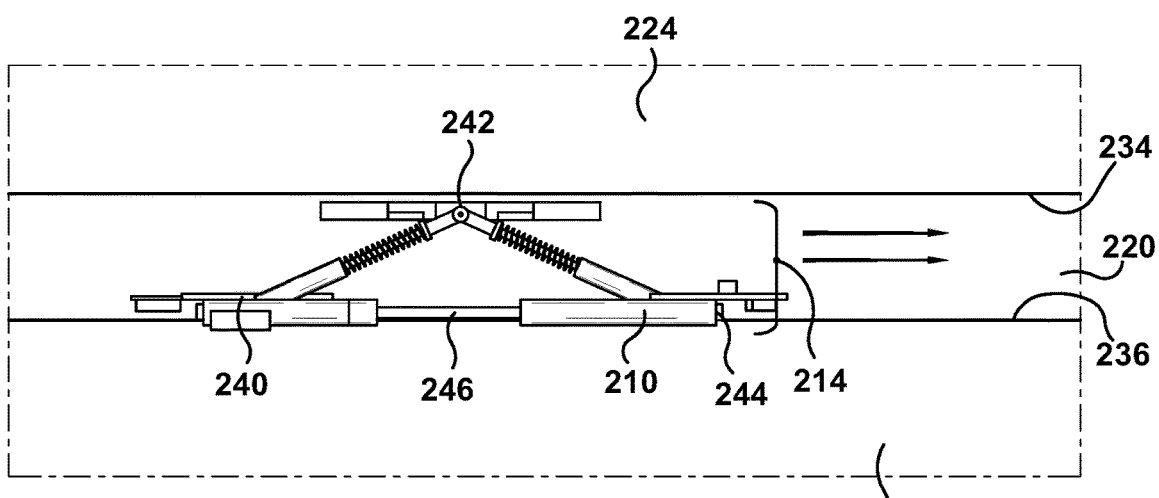
FIG. 3 shows a side section view of an expanded robotic crawler in the annular gap of a machine.
Figure 4:
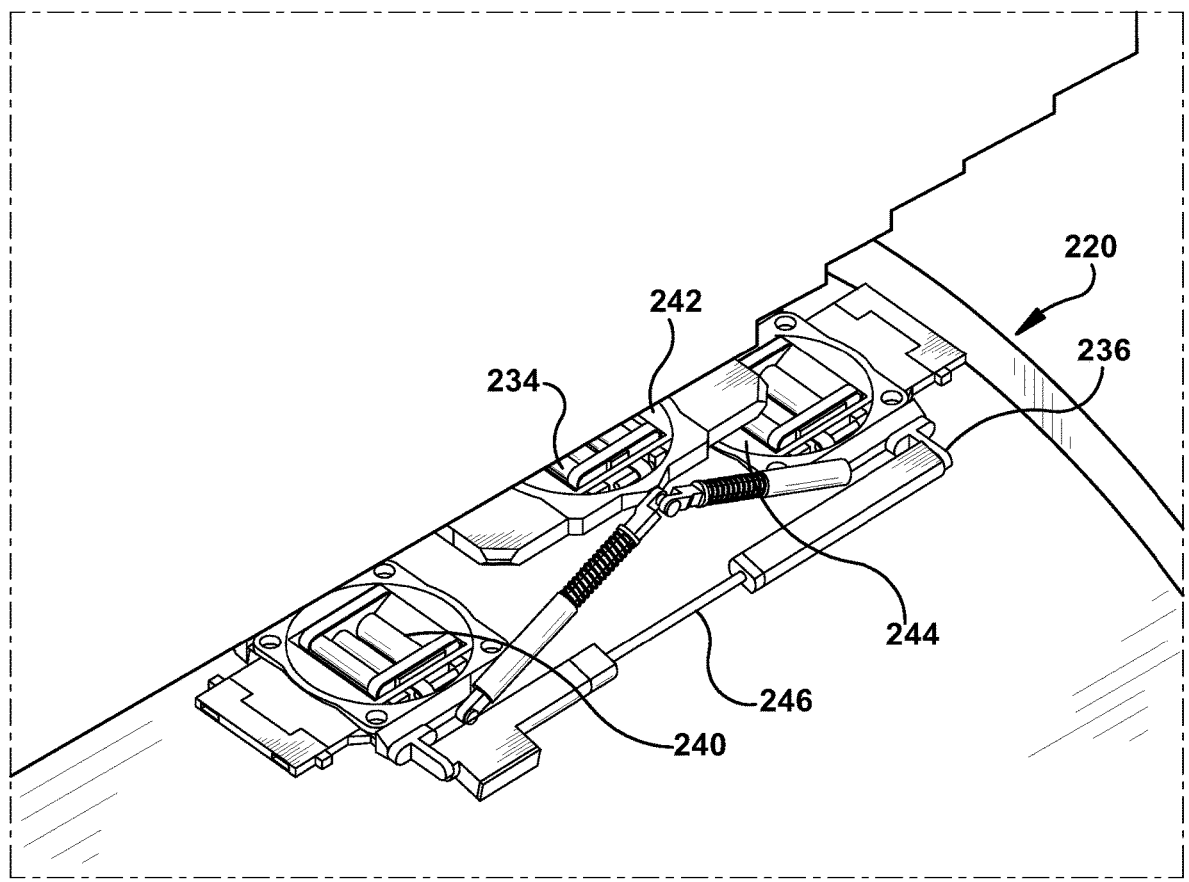
FIG. 4 shows a perspective cutaway view of an expanded robotic crawler in the annular gap of a machine according to various embodiments of the disclosure.

FIGS. 3-4 show two views of robotic crawler 210 in an expanded state within annular gap 220. When robotic crawler 210 is in its expanded state, it may engage opposed surfaces 234, 236. In an expanded state, robotic crawler 210 may define an expanded crawler width 214. Expanded crawler width 214 may be larger than collapsed crawler width 212 and entrance gap width 232, and equal to annular gap width 228 such that surface contact may be maintained with opposed surfaces 234, 236. In some embodiments, robotic crawler 210 comprises a plurality of traction modules 240, 242, 244 mounted in an expandable body 246. Traction modules 240, 244 may engage only outer surface 236 of cylindrical central member 226 and traction module 242 may engage only inner surface 234 of surrounding cylindrical member 236. In some embodiments, the configuration of traction modules 240, 242, 244 may be reversed and traction modules 240, 244 may engage only inner surface 234 of surrounding cylindrical member 236 and traction module 242 may engage only outer surface 236 of cylindrical central member 226. Traction modules 240, 242, 244 may include one or more traction drive components such as roller(s) like wheel(s) or ball(s) (see e.g., FIGS. 1, 4, 6, 7); or belt(s) or track(s) (see, e.g., FIG. 9), to move robotic crawler 210 through annular gap 220 based on moving surface contact with opposed surfaces 234, 236. Traction modules 240, 242, 244 may move robotic crawler 210 on a desired navigation path through annular gap 220.

Figure 5A:
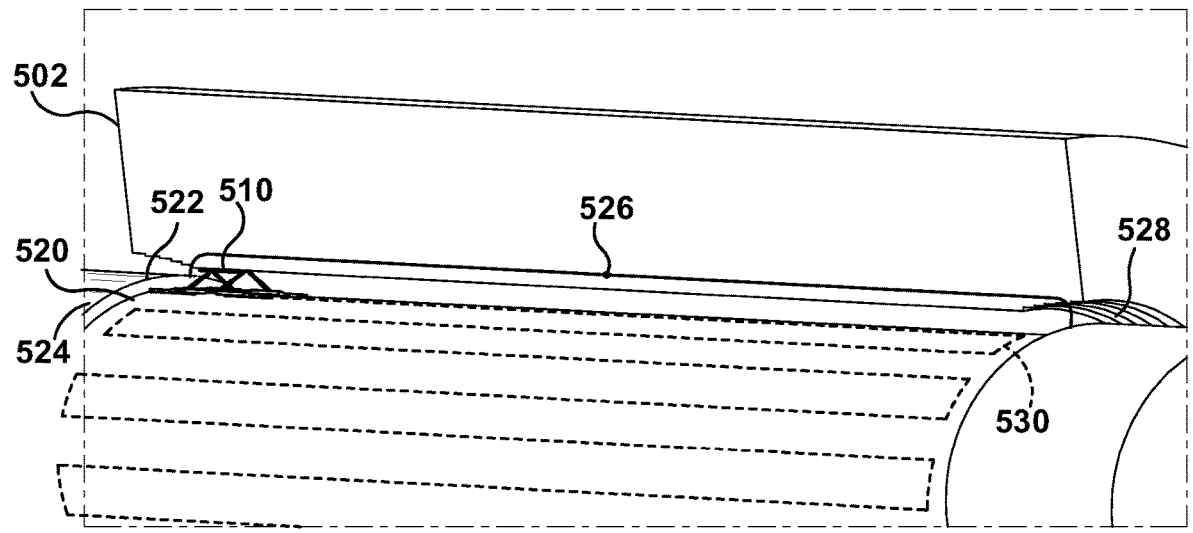
FIGS. 5A and 5B show example inspection paths of a robotic crawler in the annular gap of a machine.
Figure 5B:
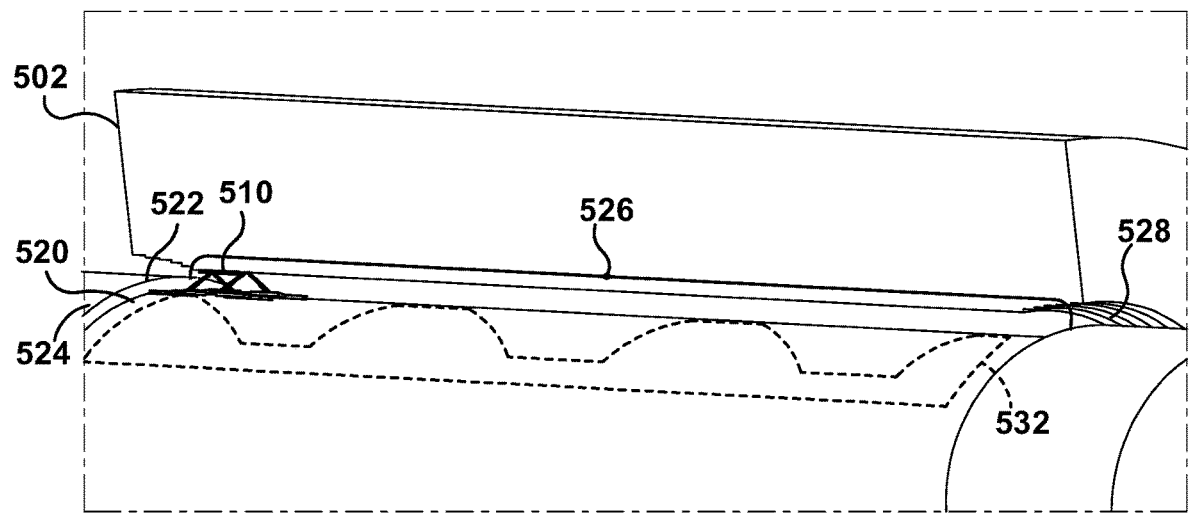

Referring to FIGS. 5A and 5B, another embodiment of a robotic crawler 510 is shown in an annular gap 520 with lines 530, 532 showing example navigation paths for inspecting annular gap 520. Robotic crawler 510 is shown in an expanded state in a starting crawler position just inside entrance gap 522 adjacent an entrance end portion 524 of the machine 502. Following line 530, robotic crawler 510 moves in a forward axial direction along a gap length 526 of annular gap 520 from the entrance end portion 524 to the closed end portion 528. In some embodiments, robotic crawler 510 may reach a step or other obstacle representing the end of the navigable gap length 526 of annular gap 520. For example, closed end portion 528 may include a step created by a retaining ring or other feature and may include another air gap into an enclosed end region of the machine. Robotic crawler 510 may include multidirectional traction modules that enable it to change its travel direction from the axial direction to the circumferential direction. Line 530 shows a number of circumferential steps along the circumference of annular gap 520. The length of the circumferential step may depend on a variety of factors related to sensor range/area (or field of view for visual sensors), test locations, desired test coverage or sampling, and/or specific machine features to be included in the navigation path to support desired test protocols using the sensor modules on robotic crawler 510. After a new circumferential position is achieved, line 530 shows a return path in the reverse axial direction along gap length 526. Robotic crawler 510 may reorient its movement direction back to an axial orientation and move in the opposite direction down the length of annular gap 520. In some embodiments, robotic crawler 510 may reach a step or other obstacle associated with entrance gap 522 and representing the end of the navigable gap length 526 of annular gap 520. Robotic crawler 510 may again reorient its travel direction for circumferential movement and make another circumferential step. Robotic crawler 510 may continue stepping through these axial passes at various circumferential positions along the circumference for the area of annular gap 520 to be inspected with the selected sensor modules and inspection protocol. In some embodiments, robotic crawler 510 may traverse gap length 236 in circumferential positions providing overlapping coverage for visual inspection around the entire circumference of annular gap 520 to provide a complete visual inspection of the surfaces of annular gap 520. Following line 532 (FIG. 5B) shows an alternate inspection path and is provided to demonstrate that a plurality of inspection paths may be enabled by multidirectional and omnidirectional movement. Line 532 takes robotic crawler 510 along an inspection path that includes axial travel, circumferential travel, and travel along intermediate orientations between the axial and circumferential directions. More complex and less repetitious inspection paths may be used for inspection of specific areas or features, as well as to navigate around known obstacles.

Figure 6:
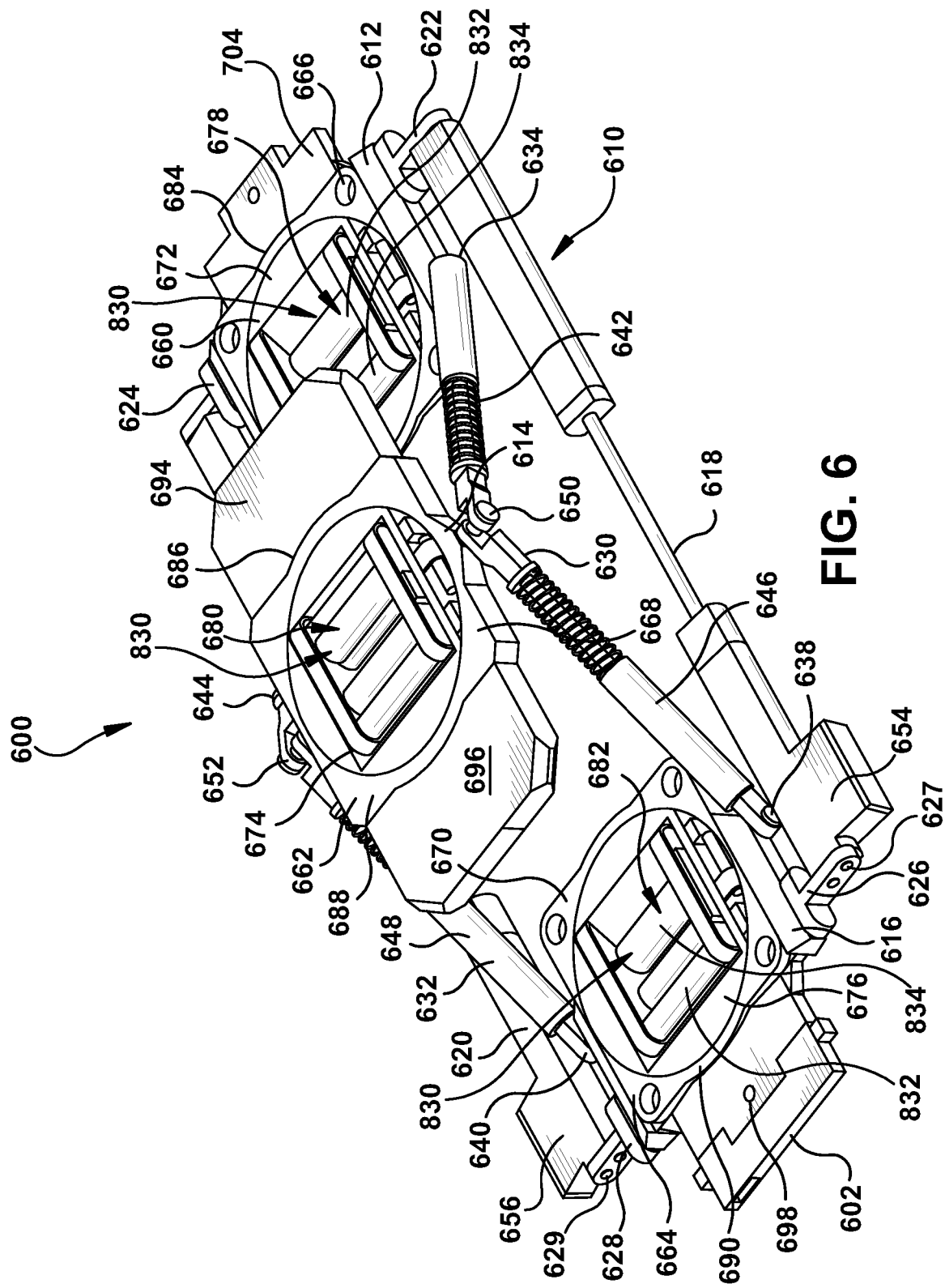
FIG. 6 shows a perspective view of a robotic crawler in its expanded state according to various embodiments of the disclosure.

Referring to FIGS. 6-8, an additional embodiment of a robotic crawler 600 is shown in several views and including an expanded state in FIG. 6 and a collapsed state in FIGS. 7-8. In some embodiments, robotic crawler 600 is a modular robot with an expandable body 610 including plurality of frames 612, 614, 616 for accommodating removable modules. Removable modules may include traction modules 660, 662, 664 that provide one or more traction drive components 678, 680, 682 such as but not limited to: rollers such as wheels or balls; or tracks or belts; or another form of locomotion for moving robotic crawler 600 along the surfaces within a gap. Robotic crawler 600 may also accommodate a plurality of sensor modules, such as navigation sensors, visual inspection sensors, structural test sensors, or electrical test sensors, using sensor interfaces that provide mechanical and/or electrical/communication/control between robotic crawler 600 and the sensor modules. For example, one or more frames may include sensor interfaces and/or the traction modules or other sensor modules may include sensor interfaces for chaining multiple modules from a single frame. The plurality of sensor interfaces may be provided at several positions on robotic crawler 600 to provide different operating positions for various sensors. For example, each frame 612, 614, 616 or traction modules 660, 662, 664 may include one or more sensor interfaces and related sensor positions. In some embodiments, there may be multiple configurations of sensor interfaces. For example, sensor interfaces for attachment to frames 612, 614, 616 or traction modules 660, 662, 664 may be different than sensor interfaces between serial sensor interfaces. Other modules may also be provided for other functions, such as a tether connector module 602.

In some embodiments, expandable body 610 includes generally rectangular base frame and includes lateral members 618, 620 on the long sides of the rectangle, connected to front frame 612 and rear frame 616, the latter providing the short sides of the rectangle. Lateral members 618, 620 may include frame attachments 622, 624, 626, 628 proximate their respective distal ends. Frame attachments 622, 624 may connect to front frame 612 and frame attachments 626, 628 may connect to rear frame 616. In some embodiments, middle frame 614 may be configured to be displaced from the plane of front frame 612 and rear frame 616 to expand the width of expandable body 610 in its expanded state. At least one link member may position a traction module against a surface in the annular gap. Middle frame 614 may be attached to extension link members 630, 632, which are connected to the rectangular base frame. For example, extension link members 630, 632 may include pivoting attachments 634, 636, 638, 640 with front frame 612 and rear frame 616 or, alternately, with lateral members 618, 620 proximate their distal ends. Extension link members 630, 632 may be articulated link members with first links 642, 644 and second links 646, 648 having pivoting attachments 650, 652 to middle frame 614. Pivoting attachments 650, 652 may act as an articulated joint in extension link members 630, 632 and move middle frame 614 perpendicular to the plane of the rectangular base frame. Expandable body 610 may include a motor or other actuator for moving middle frame 614. For example, lateral members 618, 620 may include linear actuators 654, 656 for moving front frame 612 relative to rear frame 616, changing the lengths of lateral members 618, 620 and the distance between front frame 612 and rear frame 616. When lateral members 618, 620 are in their fully extended positions, front frame 612, middle frame 614, and rear frame 616 may be in the same plane and expandable body 610 is in its narrowest or collapsed state. As lateral members 618, 620 are shortened by linear actuators 654, 656 and rear frame 616 moves toward front frame 612, extension link members 630, 632 articulate at pivoting attachments 650, 652 and first links 642, 644, second links 646, 648, and lateral members 618, 620 form an isosceles triangle with middle frame 614 moving in a direction perpendicular to the direction of movement between front frame 612 and rear frame 616. Other configurations of expandable bodies are possible, such as one or more frames being mounted on lever arms, scissor jacks, telescoping members, or other displacement mechanisms. In some embodiments, expandable body 610 may incorporate shock absorbers between front frame 612 and rear frame 616 and middle frame 614 to assist in navigating uneven gap spaces. For example, extension link members 630, 632 may incorporate telescoping links with an internal spring to assist with traction on opposed gap surfaces and compensate for some obstacles and/or changes in gap spacing. In some embodiments, lateral members 618, 620 may include emergency releases 627, 629 to disengage lateral members 618, 620 manually in the event of power loss or other failure that prevents control of linear actuators 654, 656. For example, frame attachments 626, 628 may incorporate mechanical fasteners that attach lateral members 618, 620 to frame attachments 626, 628 and these mechanical fasteners may act as emergency releases 627, 629 by enabling a user to release the mechanical fasteners and thereby disengage lateral members 618, 620 to cause expandable body 610 to collapse into its collapsed state. In some embodiments, emergency releases 627, 629 may be screws, bolts, or pins through frame attachments 626, 628 and into lateral members 618, 620 that may be removed to collapse expandable body 610. In some embodiments, expandable body 610 has a lateral shape that is an arc based on the configuration of frames 612, 614, 616 and lateral members 618, 620, most visible in FIG. 8. The arc of expandable body 610 may be configured to complement the curvature of an annular gap in which robotic crawler 600 is intended to operate. For example, the arc or curvature may be similar to the arc of the outer surface of the cylindrical central member or the inner surface of the surrounding cylindrical member that define the annular gap.

In some embodiments, each of frames 612, 614, 616 are configured to receive, position, and retain traction modules 660, 662, 664. For example, traction modules 660, 662, 664 may each be multidirectional traction modules with fixed outer frames 666, 668, 670 to removably attach to frames 612, 614, 616. Traction modules 660, 662, 664 may include rotating inner frames 672, 674, 676 that enable robotic crawler 600 to change the orientation of traction drive components 678, 680, 682 and direction of movement. Each of traction modules 660, 662, 664 may also include one or more interfaces 684, 686, 688, 690 that may be used to attach sensor modules or other functional modules, directly or in series. For example, traction module 660 may include interface 684 and is shown with a visual sensor module 692. Traction module 662 may include interfaces 686, 688 and visual sensor modules 694, 696. Traction module 664 may include interface 674, visual sensor module 698, and tether connector module 602.

FIGS. 9-15 show various views of an illustrative visual inspection module 700 for a robot. The visual inspection module includes a base frame; and a mounting interface coupled to the base frame for mounting the base frame to a body frame of the robot. An inspection unit simultaneously visually inspects a first surface facing a first direction and a spaced, second surface facing an opposing, second direction toward the first surface. The inspection unit includes a first visual sensor and a second visual sensor, each visual sensor facing in a third direction different than the first and second directions, a first reflector reflects an image of the first surface to the first visual sensor, and a second reflector reflects an image of the second surface to the second visual sensor. The visual sensors with reflectors allow for use of larger visual sensors that have increased optical focal distance, thus providing better resolution and lower distortion of the images. The images can be stitched together to create a larger two-dimensional map of the surfaces.

Figure 27:
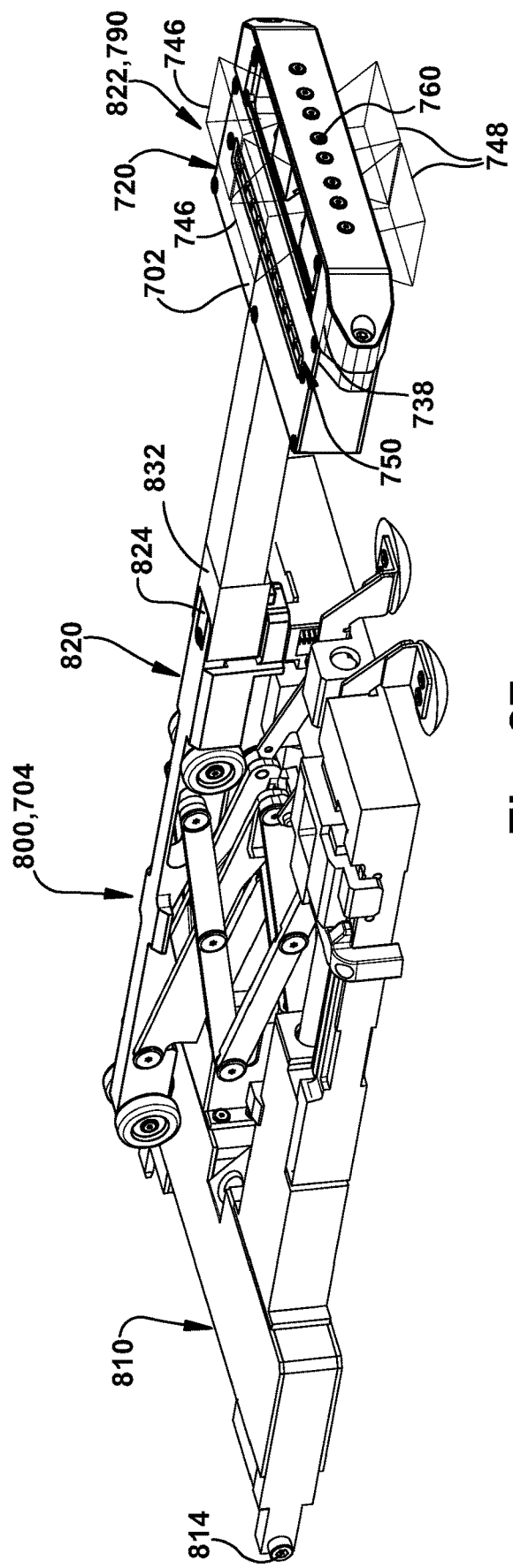
FIG. 27 shows a perspective view of a sensor interface module with yet another illustrative sensor according to one embodiment of the disclosure.

FIG. 9 shows a perspective view of the visual inspection module 700 for a robot according to various embodiments of the disclosure. In some embodiments, visual inspection module 700 (hereinafter "VIM 700") may include a module housing 702. A mounting interface 710 may couple to module housing 702 for mounting module housing 702 to a support frame 704. Support frame 704 may include any structure to which a sensor is mounted such as a body frame of the robot, e.g., robot crawler 110, or another interface (see e.g., a sensor interface module 800 as in FIG. 27). Mounting interface 710 may accommodate fasteners 712, 714 for removably attaching module housing 702 and VIM 700 to support frame 704. For example, mounting interface 710 may be configured for removable attachment to support frame 704 in the form of a body frame of the robot, for example, a sensor interface on a robotic crawler. Such as a sensor interface may be on a module mounting frame, or a previously installed module, including a traction module with a sensor interface. In some embodiments, module housing 702 may include electronics, power source, communication channels, and/or optics for one or more visual sensors. In some embodiments, mounting interface 710 may include a connector (not shown) for power and/or communication channels for control and/or data signals to and from VIM 700.

Figure 11:
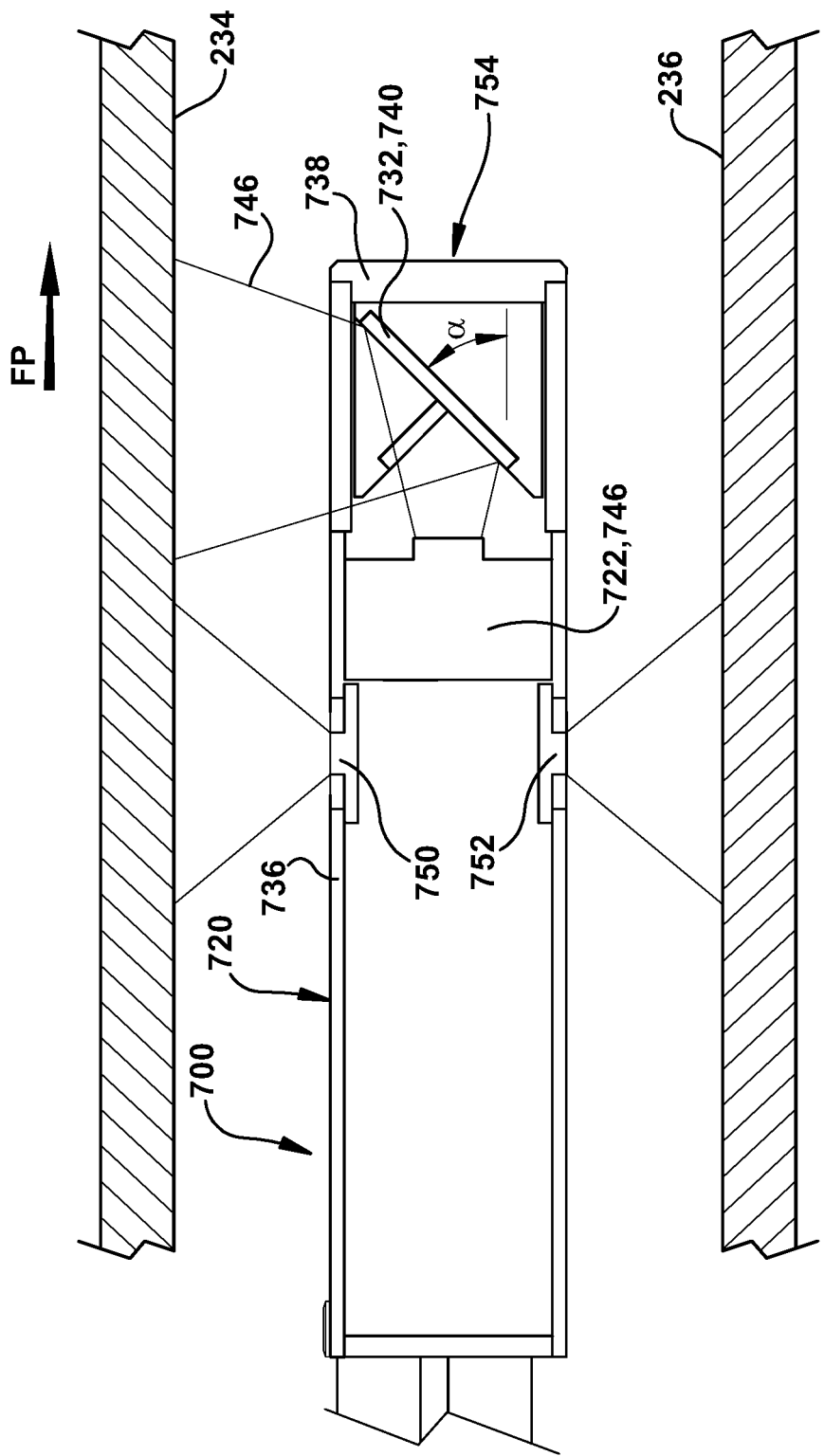
FIG. 11 shows a cross-sectional view of a visual inspection module in operation along line 11-11 in FIG. 10.
Figure 12:
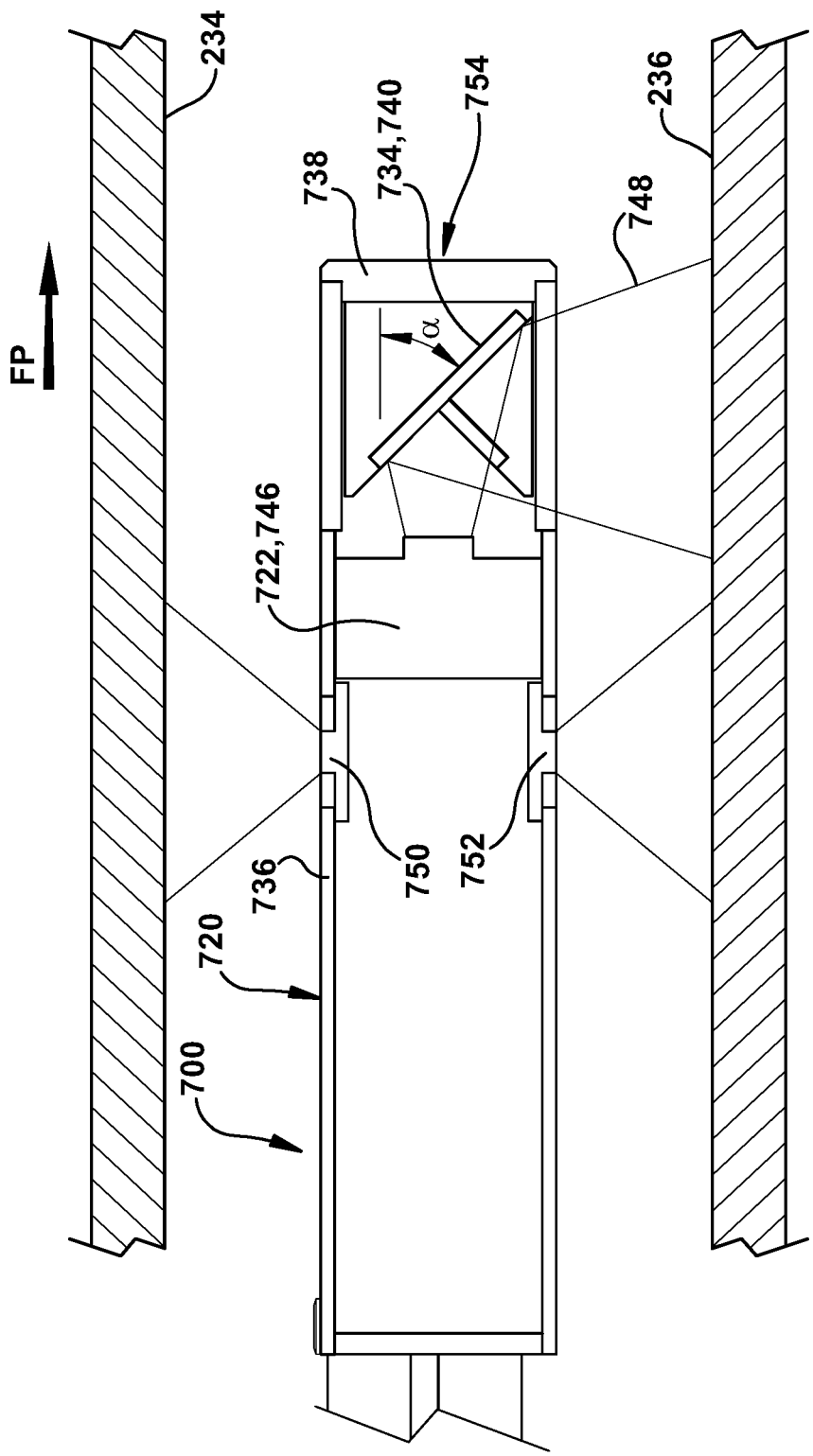
FIG. 12 shows a cross-sectional view of a visual inspection module in operation along line 12-12 in FIG. 10.

VIM 700 may also include an inspection unit 720 for simultaneously visually inspecting a first surface 234 (FIG. 3) facing a first direction and a spaced, second surface 236 (FIG. 3) facing an opposing, second direction toward first surface 234. First surface 234 may include, for example, a surface of surrounding cylindrical member 224 (e.g., a stator), and second surface 236 may include, for example, a surface of cylindrical central member 226 (e.g., a rotor). FIG. 10 shows a schematic cross-sectional view of a portion of inspection unit 720, FIG. 11 shows a cross-sectional view along line 11-11 in FIG. 10, and FIG. 12 shows a cross-sectional view along line 12-12 in FIG. 10. As shown in FIG. 10, inspection unit 720 may include a number of visual sensors including a first visual sensor 722 and a second visual sensor 724. As shown best in FIGS. 11 and 12, in contrast to conventional systems that aim each visual sensor at surfaces 234, 236 (FIG. 3), each visual sensor 722, 724 does not face surfaces 234, 236 but rather in a direction perpendicular thereto. In the example shown, visual sensors 722, 724 face in a third direction commensurate with a forward path FP of movement of the robot. Inspection unit 720 also includes a first reflector 732 configured to reflect an image of first surface 234 to first visual sensor 722, and a second reflector 734 configured to reflect an image of second surface 236 to second visual sensor 724. In some embodiments, shown in FIGS. 9 and 10, a pair of first visual sensors 722, 726 and a pair of first reflectors 732, 740, one first reflector for each first visual sensor 722, 726, may be employed. Further, a pair of second visual sensors 724, 728 and a pair of second reflectors 734, 743, one second reflector for each second visual sensor 724, 728, may be employed. As shown in FIGS. 11 and 12, each first reflector 732, 740 is angled at approximately 45° (angle α) relative to respective first visual sensor's 722, 726 sight line (along forward path FP) to redirect the sight line towards first surface 234, i.e., in the first direction. Similarly, each second reflector 734, 742 is angled at approximately 45° (angle β) relative to respective second visual sensors' 722, 726 sight line (along forward path FP) to redirect the sight line towards second surface 236. Each reflector 732, 734, 740, 742 may include any form of reflective element for the visual sensor type employed, e.g., a mirror for an optical visual sensor. First visual sensors 722, 726 thus face a forward path of movement of the robot, and sight line 746 thereof is substantially perpendicular thereto, and second visual sensors 724, 728 thus face a forward path of movement of the robot, and have a sight line 748 thereof that is substantially perpendicular thereto. That is, the sight lines of visual sensors 722, 724, 726, 728 are perpendicular to a direction in which each surface 234, 236 faces. Reflectors 732, 734, 740, 742 redirect a sight line 746, 748 of the visual sensors toward the respective surface 234, 236.

Visual sensors 722, 724 and reflectors 732, 734 may be embedded in a housing 736 of inspection unit 720. In FIGS. 9-15, housing 736 is separate from module housing 702. In one embodiment, shown in FIG. 9, reflectors 732, 734 may be positioned in a reflector housing 738 that is coupled to housing 736; however, an integral housing (see e.g., FIG. 12) can also be used. In any event, visual sensors 722, 724 and reflectors 732, 734 are inside a protective housing, e.g., to prevent clearance issues with an adjacent machine surface. Any form of protective covers or windows necessary to protect reflectors 732, 734, 740, 742 may be employed.

Visual sensors 722, 724, 726, 728 can be cameras such as video cameras, but can also be other forms of visual sensors such as those that employ ultraviolet or infrared spectrums or other imaging technologies, the output of which are referred to herein as 'images' regardless of type. In some embodiments, visual sensors 722, 724, 726, 728 may include a variety of controls for position/direction of view, focus, field width, aperture size, frame rates, and other settings for controlling visual data quality (or quantity). Some or all of these adjustments may be manually set outside of the machine and/or are configured for remote control through a sensor control bus in the robotic crawler or wireless communication with the robotic crawler and/or control system 150 (FIG. 1), enabling dynamic adjustments during operation of the robotic crawler within the gap of the machine. Visual sensors 722, 724, 726, 728 can be identical, if desired. The visual sensors with reflectors, rather than just visual sensors in the form of video cameras, allow for use of larger visual sensors that have increased focal distance, e.g., an optical focal distance of a video camera. For example, visual sensors 722, 724, 726, 728 are not limited in their length since they are arranged on their sides in contrast to conventional arrangements that place them vertically and must have be limited in height to allow for entry into the machine. Visual sensors and reflectors, as described herein, thus provide better resolution and lower distortion of the images.

Figure 13:
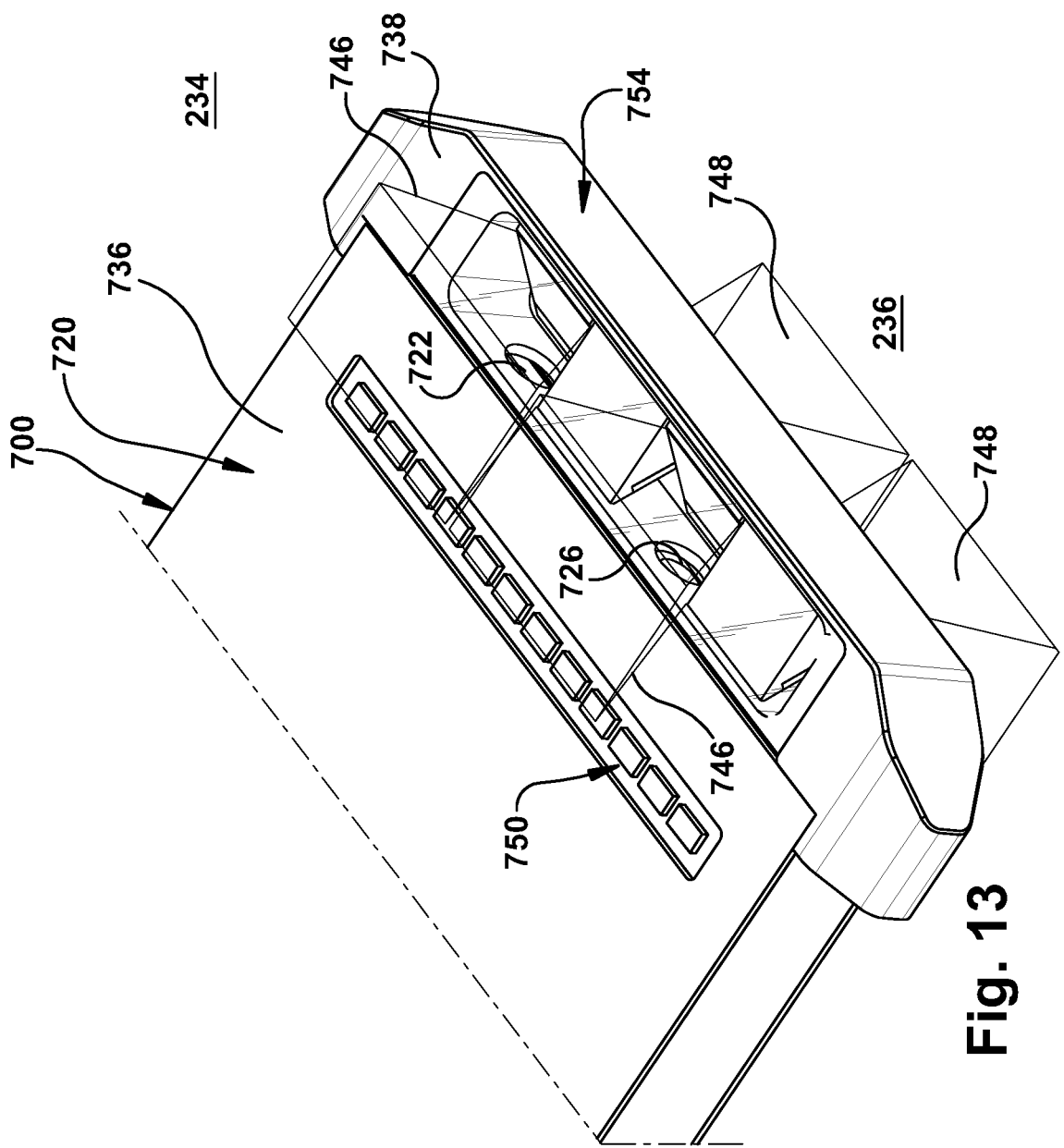
FIG. 13 shows an enlarged perspective view of part of a visual inspection module according to various embodiments of the disclosure.

In addition, as shown in the enlarged perspective view of FIG. 13, sight lines 746 of pair of first visual sensors 722, 726 may overlap, and sight lines 748 of pair of second visual sensors 724, 728 may overlap. In this fashion, missing any area of surfaces 234, 236 can be avoided. Control system 150 may include an image stitching algorithm, e.g., as part of data analysis module 183 (FIG. 1) for the robot to: stitch images from each of the pair of first visual sensors 722, 726, and stitch images from each of the pair of second visual sensors 724, 728. In this fashion, VIM 700 may increase an overall view path (i.e., of multiple sight lines) and reduce time and number of passes for the robot. In addition, VIM 700 can allow creation of a two-dimensional image or map of surfaces 234, 236 across and entire machine, e.g., rotor and stator.

As shown in FIGS. 9-13, where desired, VIM 700 may also include a first light source 750 to illuminate first surface 234, a second light source 752 to illuminate second surface 236, and a third light source 754 to illuminate a forward path FP of movement of the robot. Light sources 750, 752 may be positioned, for example, in opposing sides of housing 736, and light sources 754 may be positioned in reflector housing 738, if provided, or in housing 736, if reflector housing 738 is not provided. Each light source 750, 752, 754 may improve visibility of visual sensors 722, 724, 726, 728. Light sources 750, 752, 754 may include, for example, light emitting diodes (LED) with diffusers recessed into housing 736 or 738.

VIM 700 may also include a navigation camera 760 in inspection unit 720 (FIG. 27) or module housing 702 (FIG. 9). In either case, navigation camera 760 faces toward forward path FP of movement of the robot, and provides vision to robot crawler 110 and/or control system 150 (FIG. 1).

With further reference to FIG. 9 and the side views of FIG. 14A and 14B, in some embodiments, VIM 700 may also include a lifting system 770 configured to adjust a position of inspection unit 720 relative to module housing 702 and between first and second surfaces 234, 236. In some embodiments, lifting system 770 includes a pair of arms 772, 774 pivotally coupled to each of inspection unit 720 and module housing 702. Pair of arms 772, 774 are of the same length. Pair of arms 772, 774 may be axially offset relative to inspection unit 720 and module housing 702, creating, as shown best in FIG. 14B, a parallelogram configuration for maintaining inspection unit 720 substantially parallel to first and second surfaces 234, 236. More specifically, arm 772 may pivotally couple to module housing 702 at a location that is axially rearward of where arm 774 pivotally couples to module housing 702. Further, arm 772 may pivotally couple to inspection unit 720 at a location that is axially rearward of where arm 774 pivotally couples to inspection unit 720. In this fashion, arms 772, 774 maintain inspection unit 720 in a parallel arrangement with surfaces 234, 236. Lifting system 770 may also include a motor 776 to pivot at least one of pair of arms 772, 774 to adjust the positon of inspection unit 720. Motor 776 may be controlled by control system 150 (FIG. 1), and may be coupled to, for example, rotate arm 772 or 774. In the drawings, motor 776 is shown in module housing 702 configured to rotate arm 772. Rotation of either arm 772, 774, e.g., counterclockwise as shown in FIGS. 14A and 14B, lifts inspection unit 720 above module housing 720 bringing it closer to an upper surface 234. Due to the parallelogram arrangement, rotation of either arm causes the other to follow the other arm. Rotation of either arm 772, 774 clockwise would similarly lower inspection unit 720 relative to module housing 702. It is understood that the vertical adjustment shown in FIGS. 14A and 14B is radial in relation to surrounding cylindrical member 224 (FIG. 3) and cylindrical central member 226 (FIG. 3). Adjustable radial positioning of inspection unit 720 provides a number of advantages. For example, adjustable radial positioning of inspection unit 720 allows for clearance over, for example, raised surfaces 780, e.g., like a retaining ring, and/or a closer up inspection of surface(s) 234, 236. It also allows for optimizing the focus of inspection unit 720 for different sizes of machines (e.g., generators) with varying airgap sizes, e.g., roughly from 5 centimeters (cm) to 15 cm. The radial position of inspection unit 720 may be different during the inspection depending on the generator size. Adjustable radial positioning of inspection unit 720 also allow for adjustment of the view width to be as wide as possible for both surfaces, e.g., rotor and stator.

With reference to FIG. 15, a perspective view of a visual inspection module (VIM) 790 according to an alternative embodiment is illustrated. In this embodiment, VIM 790 does not include lifting system 770, and inspection unit 720 is coupled to or part of module housing 702. That is, housing 736 (FIG. 9) and module housing are integral. In one embodiment, shown in FIG. 15, reflectors 732, 734 may be positioned in a reflector housing 738 that is coupled to module housing 702; however, an integral housing can also be used. In some embodiments, VIM 790 may include module housing 702, and mounting interface 710 may couple to module housing 702 for mounting module housing 702 to support frame 704, e.g.., a body frame of the robot, e.g., robot crawler 110, or another interface (e.g., sensor interface module 800 as in FIG. 27). As noted, mounting interface 710 may accommodate fasteners 712, 714 for removably attaching module housing 702 and VIM 790 to support frame 704. For example, mounting interface 710 may be configured for removable attachment to support frame in the form of a sensor interface on a robotic crawler, such as a sensor interface on a module mounting frame or a previously installed module, including a traction module with a sensor interface. In some embodiments, module housing 702 may include electronics, power source, communication channels, and/or optics for one or more visual sensors. In some embodiments, mounting interface 710 may include a connector (not shown) for power and/or communication channels for control and/or data signals to and from VIM 700. In this embodiment, module housing 702 does not include any lifting system motors 776 (FIG. 9). In contrast to FIG. 9, module housing 702 may include a navigation camera 760 in module housing 702 in front of inspection unit 720. Navigation camera 760 faces toward forward path FP of movement of the robot, and provides vision to robot crawler 110 and/or control system 150 (FIG. 1). Inspection unit 720 may be as otherwise described herein.

Figure 16:
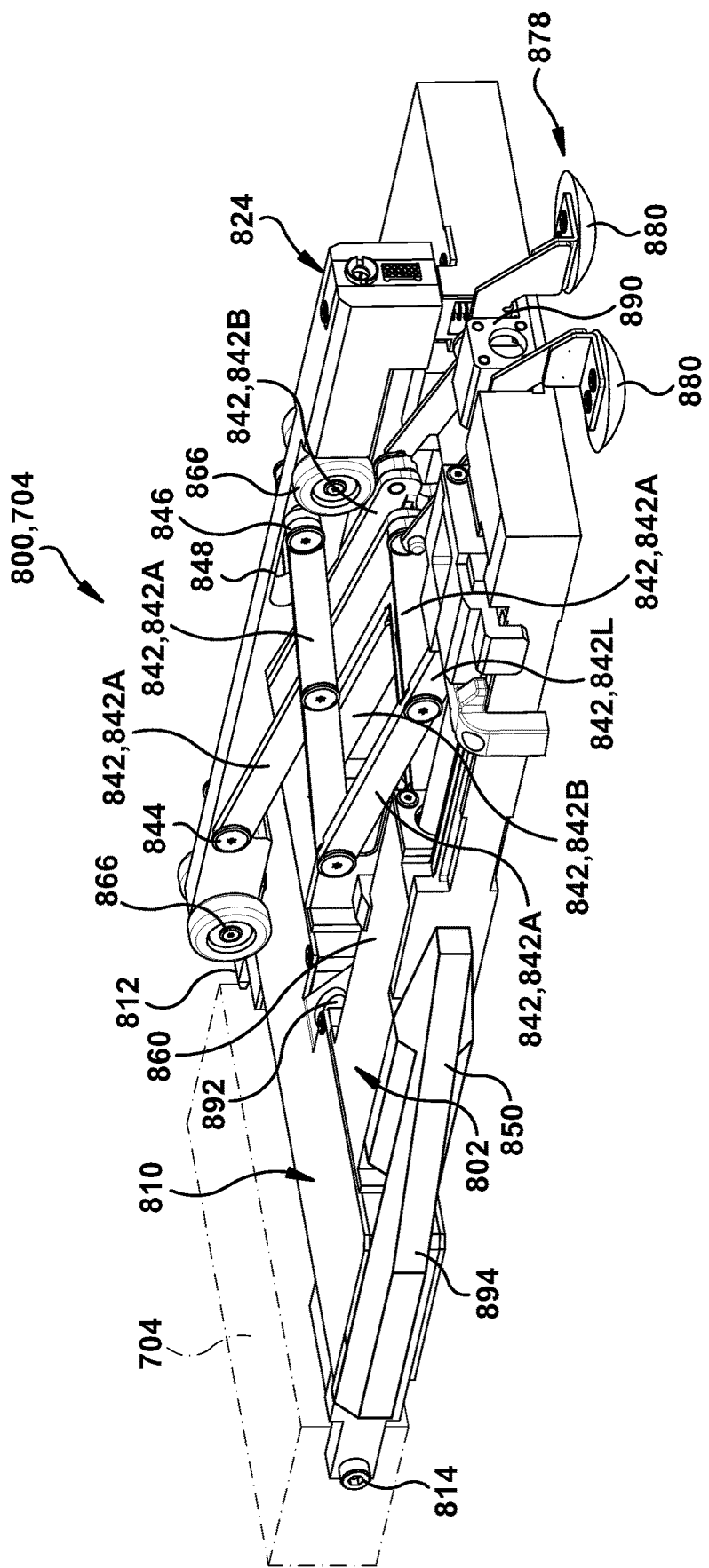
FIG. 16 shows a perspective view of a sensor interface module in an expanded position according to various embodiments of the disclosure.

Referring to FIGS. 16-27, a sensor interface module 800 for a robot according to various embodiments will be described. Sensor interface module 800 is configured to allow use of a wide variety of different sensors 822 (FIGS. 18, 19, 24-27) with a single sensor interface, and allow selective radial positioning of each sensor used. FIG. 16 shows a perspective view of sensor interface module 800 (hereinafter "SIM 800") in an expanded position, and FIG. 17 shows a perspective view of SIM 800 in a retracted position. (It is noted that FIGS. 16, 17, 20, 21, 22 and 23 do not show a sensor 822 on SIM 800.) In some embodiments, SIM 800 may include a module housing 802. A mounting interface 810 may couple to module housing 802 for mounting module housing 802 to a support frame 704 (FIG. 16 only) of the robot, e.g., robot crawler, or another sensor interface. Mounting interface 810 may accommodate fasteners 812, 814 for removably attaching module housing 802 and SIM 800 to a robotic crawler. For example, mounting interface 810 may be configured for removable attachment to body frame of the robot in the form of a sensor interface on a robotic crawler, such as a sensor interface on a module mounting frame or a previously installed module, including a traction module with a sensor interface. In some embodiments, module housing 802 may include electronics, power source, communication channels, and/or optics for one or more visual sensors. In some embodiments, mounting interface 810 may include a connector (not shown) for power and/or communication channels for control and/or data signals to and from SIM 800.

SIM 800 may also include a sensor mount 820 configured to connect a selected one of a plurality of different sensors 822 (e.g., FIGS. 24-27) to the sensor mount. Sensor 822 may include any of a wide variety of sensors typically used in inspecting an annular gap in a machine, but modified for use according to embodiments of the disclosure. More particularly, in contrast to conventional sensor interfaces which include a single type of sensor, SIM 800 includes sensor mount 820 having a common or universal sensor connection port 824 configured to connect a selected one of a plurality of different sensors to the sensor mount. As shown in the enlarged perspective view of FIG. 18, connection port 824 may include a mechanical mounting element 826, and an electrical connection element 828. Mechanical mounting element 826 may include any now known or later developed mechanical coupling, such as but not limited to: a male/female connector, a male/female connector with a releasable retainer, a threaded female hole to receive a threaded rod member, or other mechanism to mechanically couple two parts. Each sensor 822, one example of which is shown in FIG. 18 in the form of an electromagnetic integrity testing module 830, may include a mating connection member 832 configured to mate with common sensor connection port 824 on sensor mount 820. Connection member 832 may include a mating mechanical mounting element 834, e.g., threaded male fastener or other mating mechanical coupling for element 826, for mechanically coupling sensor 822 to mechanical mounting element 826 on sensor mount 820. Further, connection member 832 of each sensor 822 may include a mating electrical connection element 836 for electrically connecting sensor 822, e.g., any electrical aspects thereof, to electrical connection element 828 of sensor mount 820. Additional wiring or other communications formats, can be used to extend the electrical connection through sensor mount 820 to the robot, e.g., control system 150 (FIG. 1)). Hence, any variety of sensor 822 can be operationally coupled to sensor mount 820 using common sensor connection port 824 of sensor mount 820 and connection member 832 of each sensor 822.

SIM 800 may also include a scissor lift 840 for maintaining sensor mount 820 substantially parallel to a first and second surfaces 234, 236. Substantially parallel indicates with some degree of flexibility, e.g., within +/−3°. As shown in the side view of FIG. 19 with SIM 800 and as previously explained, first surface 234 faces a first direction and a spaced, second surface 236 faces an opposing, second direction toward the first surface. Scissor lift 840 may include any now known or later developed that uses linked, folding supports 842 in a criss-cross "X" pattern, known as a pantograph. As shown in FIG. 16 and the top down perspective view of FIG. 20, a set of folding supports 842 may be coupled to each side of sensor mount 820, but this may not be necessary in all instances. Set of folding supports 842A are on the near side of sensor mount 820 in FIG. 16, and set of folding supports 842B are on the far side of sensor mount 820 in FIG. 16. A sensor mount end of scissor lift 840 may have a link pivot 844 pivotally coupled to sensor mount 820 with a link coupling 846 slidably mounted in a slot 848 in sensor mount 820. Similarly, a module housing end of scissor lift 840 may have a link pivot 850 (hidden behind motor 860 of motorized transmission 870 in FIGS. 16, 17, 20) pivotally coupled to module housing 802 with a link coupling 862 coupled to a lowermost front end of a lowermost support 842L. As shown best in FIG. 19, sensor mount 820 may optionally include a roller 866 positioned thereon to rollingly space sensor mount 820 from first or second surface 234, 236. In the drawings, two rollers 866 are shown, but any number including one or more than three can be employed. Further, while SIM 800 is shown with scissor lift 840 moving toward surface 234, it is recognized that SIM 800 can be used in the opposite direction such that scissor lift 840 moves toward surface 236.

SIM 800 may also include a motorized transmission 870 configured to move scissor lift 840 between an expanded position (FIGS. 16 and 20) from module housing 802, and a retracted position (FIG. 17) within module housing 802. As understood, as part of the movement between the two positions, scissor lift 840 can be stopped at any intermediate location in between the two positions. The expanding, upward motion is achieved by the application of force to lowermost supports 842L (in a rearward direction in the example shown), elongating the crossing pattern (FIGS. 16 and 20), and propelling sensor mount 820 away from module housing 802, vertically as shown. Motorized transmission 870 may include any form of linear actuator capable of moving an end of a lowermost support 842L to expand or retract scissor lift 840. In one example, motorized transmission 870 may include a motor 860 within module housing 802, and any form of transmission 872 capable of moving lowermost support 842L rearwardly to expand and forwardly to retract. For example, transmission 872 may include a lead screw that engages with a guided nut on lowermost support 842L.

Figure 23:
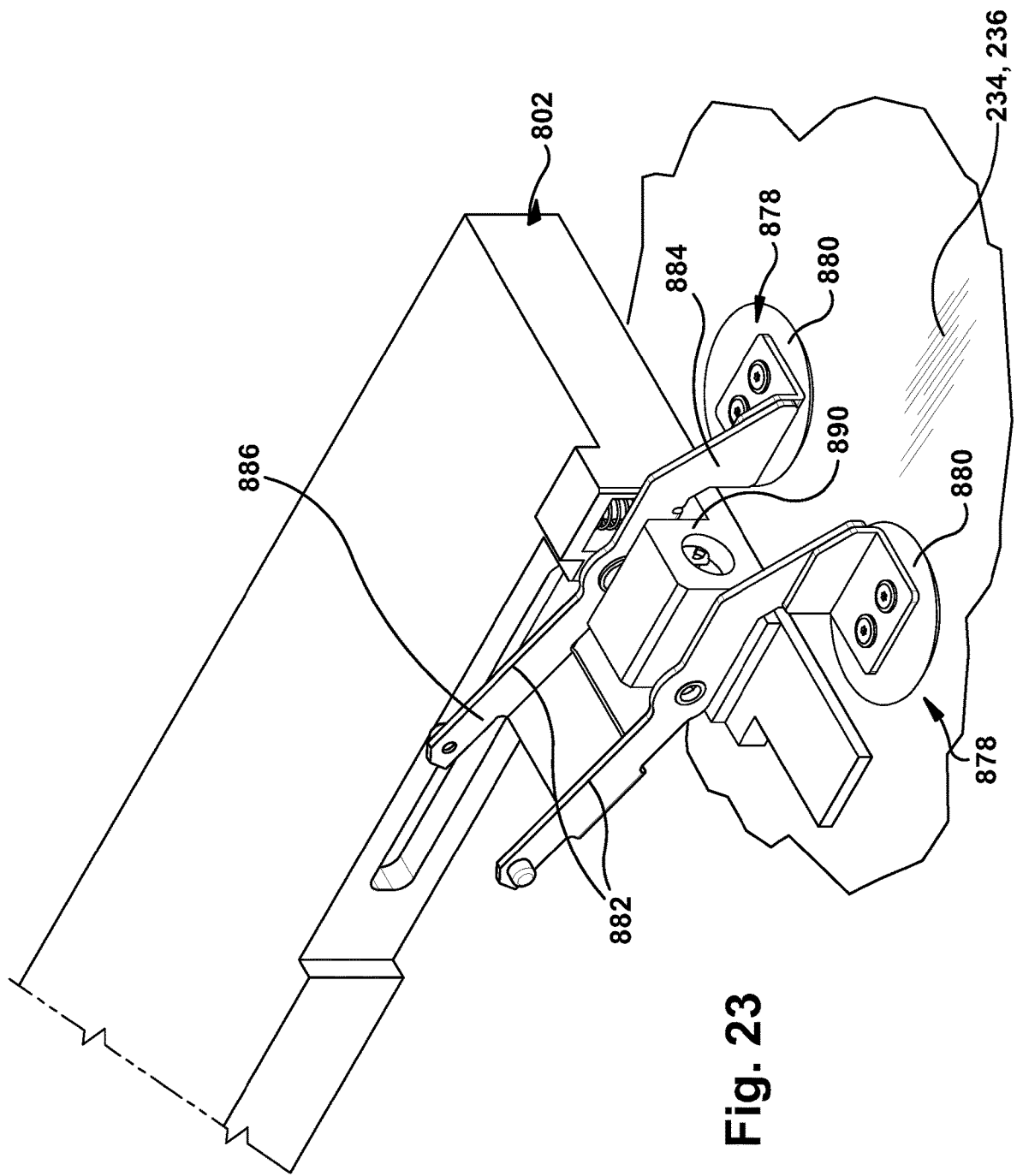
FIG. 23 shows a perspective view of a retractable slider for a sensor interface module according to various embodiments of the disclosure with a sensor mount and scissor lift of the latter removed.
Figure 24:
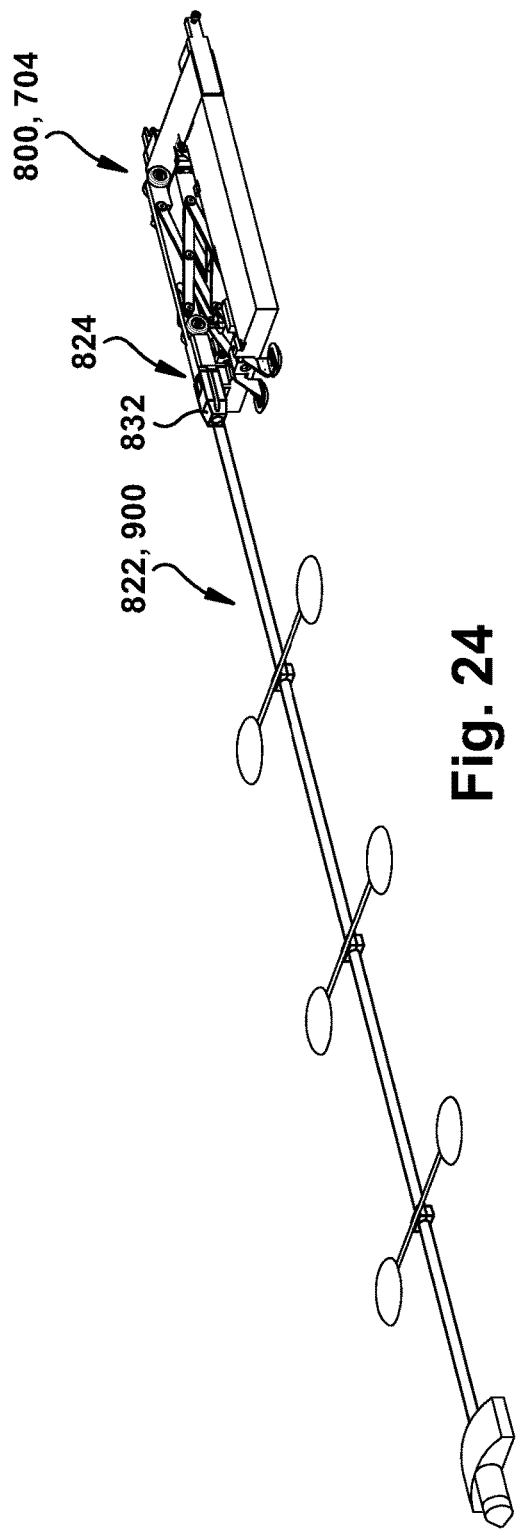
FIG. 24 shows a perspective view of a sensor interface module with an illustrative sensor according to one embodiment of the disclosure.

Module housing 802 of SIM 800 may also include a retractable slider 878. FIG. 21 shows a front view of SIM 800 with retractable slider 878 in a retracted position, and FIG. 22 shows a front view of SIM 800 with retractable slider 878 in an extended position. FIG. 23 shows a view of one embodiment of retractable slider 878 with sensor mount 820 (FIGS. 16-17) and scissor lift 840 (FIGS. 16-17) removed. Retractable slider 878 is movable between an extended, surface engaging position, shown in FIGS. 16, 19, 22 and 23, and a retracted position, shown FIGS. 17 and 21. As shown in FIG. 23, retractable slider 878 may include a pivotable, spring loaded arm 882 biased to the extended, surface engaging position. Foot 880 (two shown in example) is coupled to a forward end 884 of spring loaded arm 882 such it can pivot with the arm. Any form of spring biasing may be employed, e.g., a leaf springs, compression springs, etc. In the surface engaging position, shown in FIGS. 16, 19 and 22, foot 880 of retractable slider 878 engages one of first and second surfaces 234, 236 for supporting module housing 802 in response to scissor lift 840 being in the expanded position from the module housing. More particularly, when scissor lift 840 is in an expanded position, as shown best in FIGS. 16, 19 and 22, a portion thereof or a part coupled thereto (e.g., sensor mount 820) is out of engagement with a rear end 886 (FIG. 23) of spring loaded arm 882. As shown best in FIG. 23, in this situation, spring loaded arm 882 pivots (forwardly) to extend foot 880 to engage surface 234, 236. In the retracted position, shown in FIGS. 17 and 21, foot 880 is disengaged from surface 234, 236 in response to scissor lift 840 being in a retracted position within module housing 802. More particularly, when scissor lift 840 is in a collapsed position, as shown in FIGS. 17 and 21, a portion thereof or a part coupled thereto engages with rear end 886 (FIG. 23) of spring loaded arm 882, pivoting the arm against the bias to pivot to retract foot 880. While a particular mechanism to retract and extend retractable slider 878 has been illustrated, it is recognized that a wide variety of other mechanisms may be employed such as but not limited to a cam mechanism.

Figure 19:
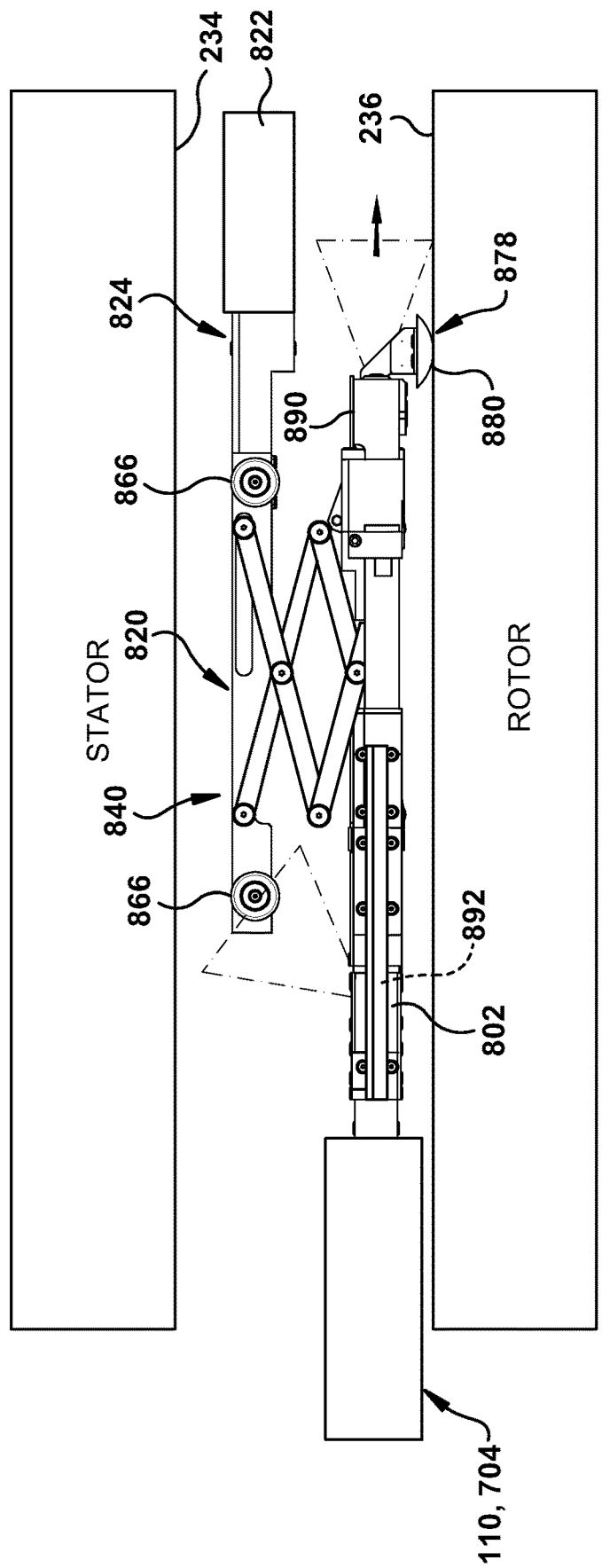
FIG. 19 shows a side view of a sensor interface module in operation according to various embodiments of the disclosure.
Figure 20:
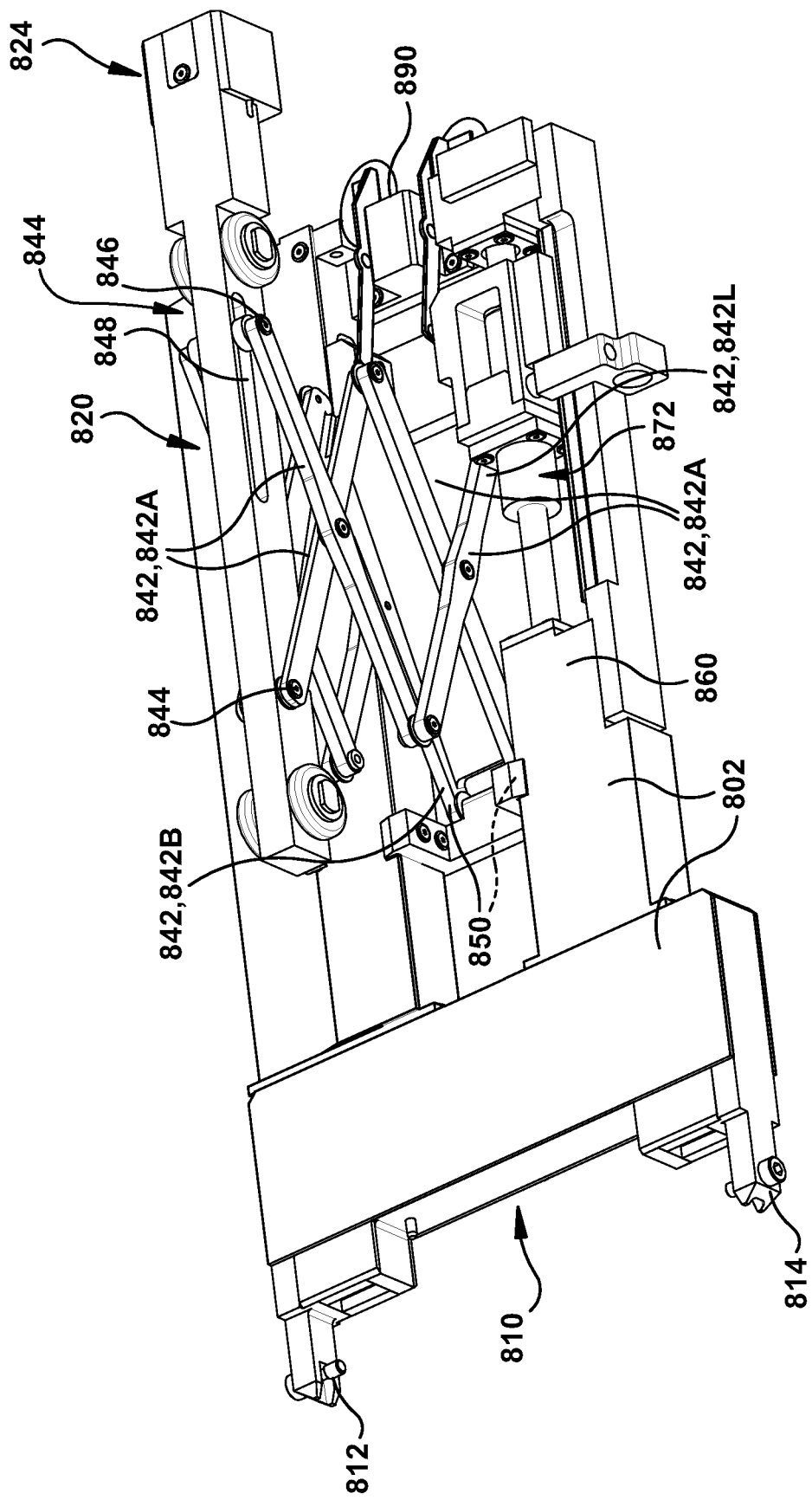
FIG. 20 shows a perspective view of a sensor interface module in an expanded position according to various embodiments of the disclosure.

As shown in FIGS. 16, 19 and 22, SIM 800 may also include a navigation camera 890 coupled to module housing 802. Navigation camera 890 faces toward a forward path of movement of the robot. SIM 800 may also optionally include, as shown in FIGS. 16, 17 and 19, a positioning camera 892 having a sight line towards sensor mount 820. Positioning camera 892 allows a user to determine the location of sensor mount 820 and thus any sensor 822 coupled thereto.

SIM 800 may also include an emergency release 894 to retract the scissor lift 840 without motor 860, i.e., without motorized transmission 870. Emergency release 894 may be necessary where, for example, power or communication loss or mechanical damage that prevents retraction of scissor lift 840. Emergency release 894 may include any system to remove a connector (not shown) connection lowermost support 842L with motorized transmission 870. For example, emergency release 894 may include a motor configured to detach motorized transmission 870 from lowermost support 842L, allowing scissor lift 840 to retract into module housing 802. Upon activation of release 894, scissor lift 840 with sensor mount 820 is instantly retracted, flattening SIM 800 such that it can be passed through entrance gap 222 (FIG. 2).

Figure 28:
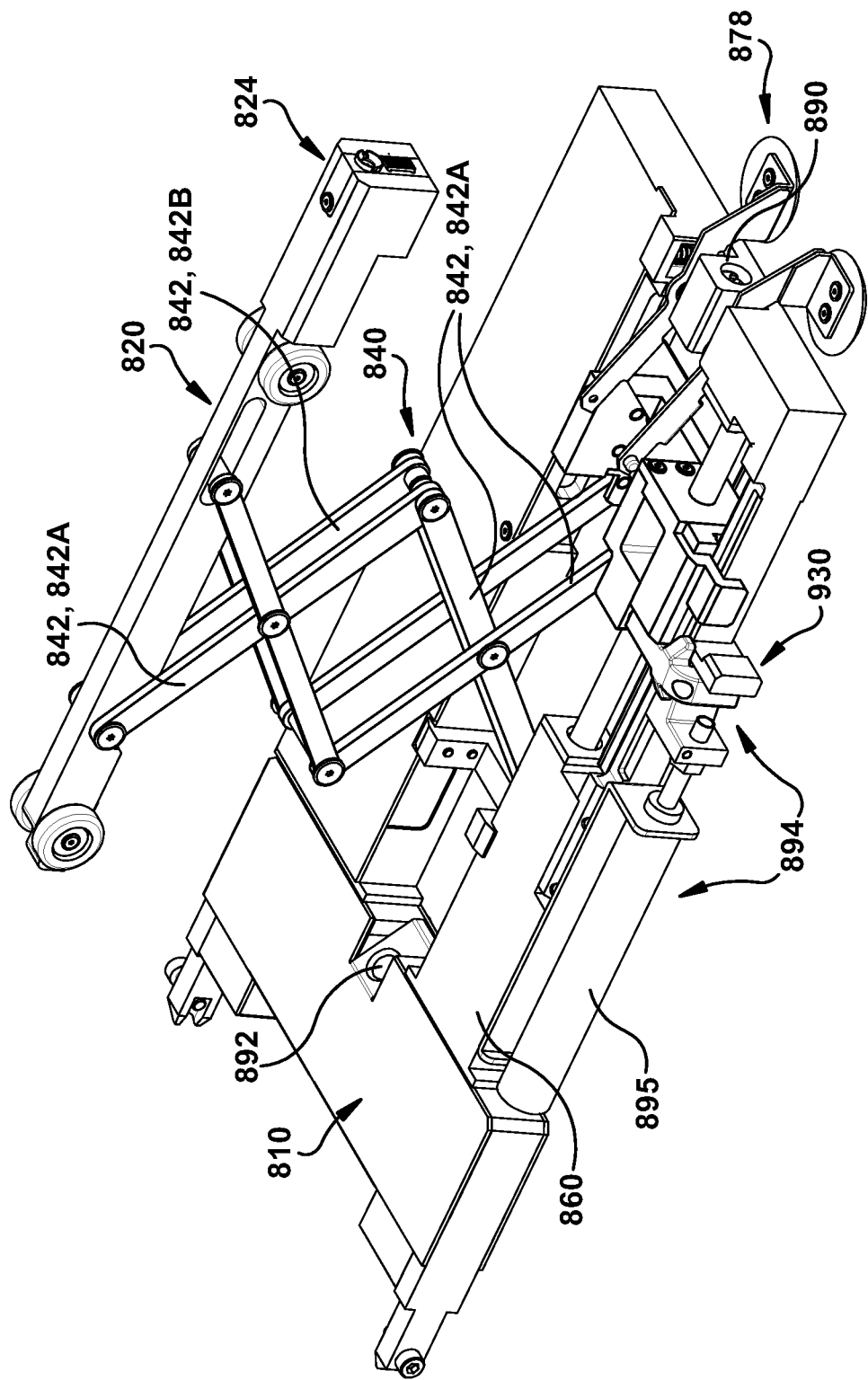
FIG. 28 shows a perspective view of a sensor interface module with another emergency release according to one embodiment of the disclosure.
Figure 29:
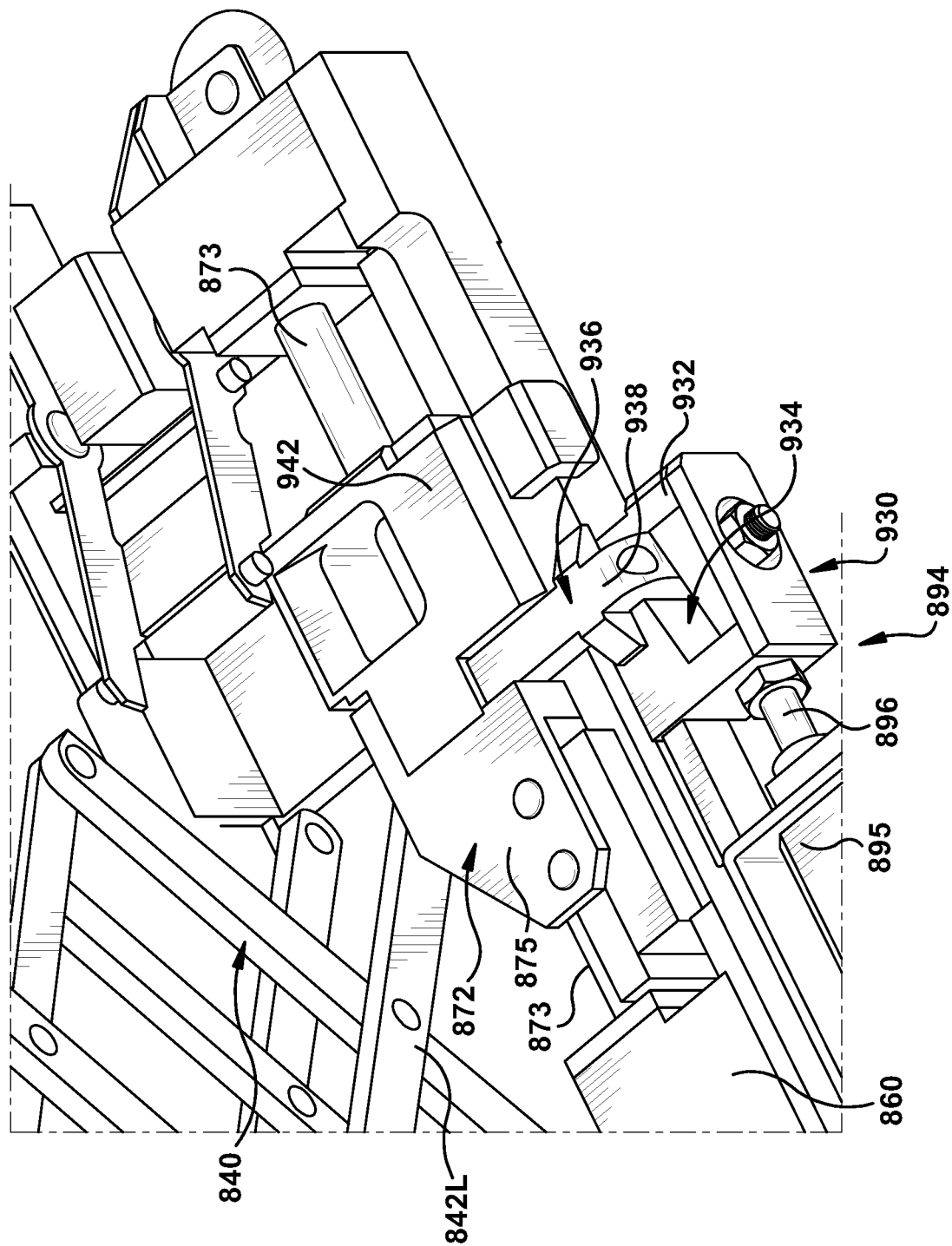
FIG. 29 shows an enlarged perspective view of the emergency release of FIG. 28 in a non-released position.
Figure 30:
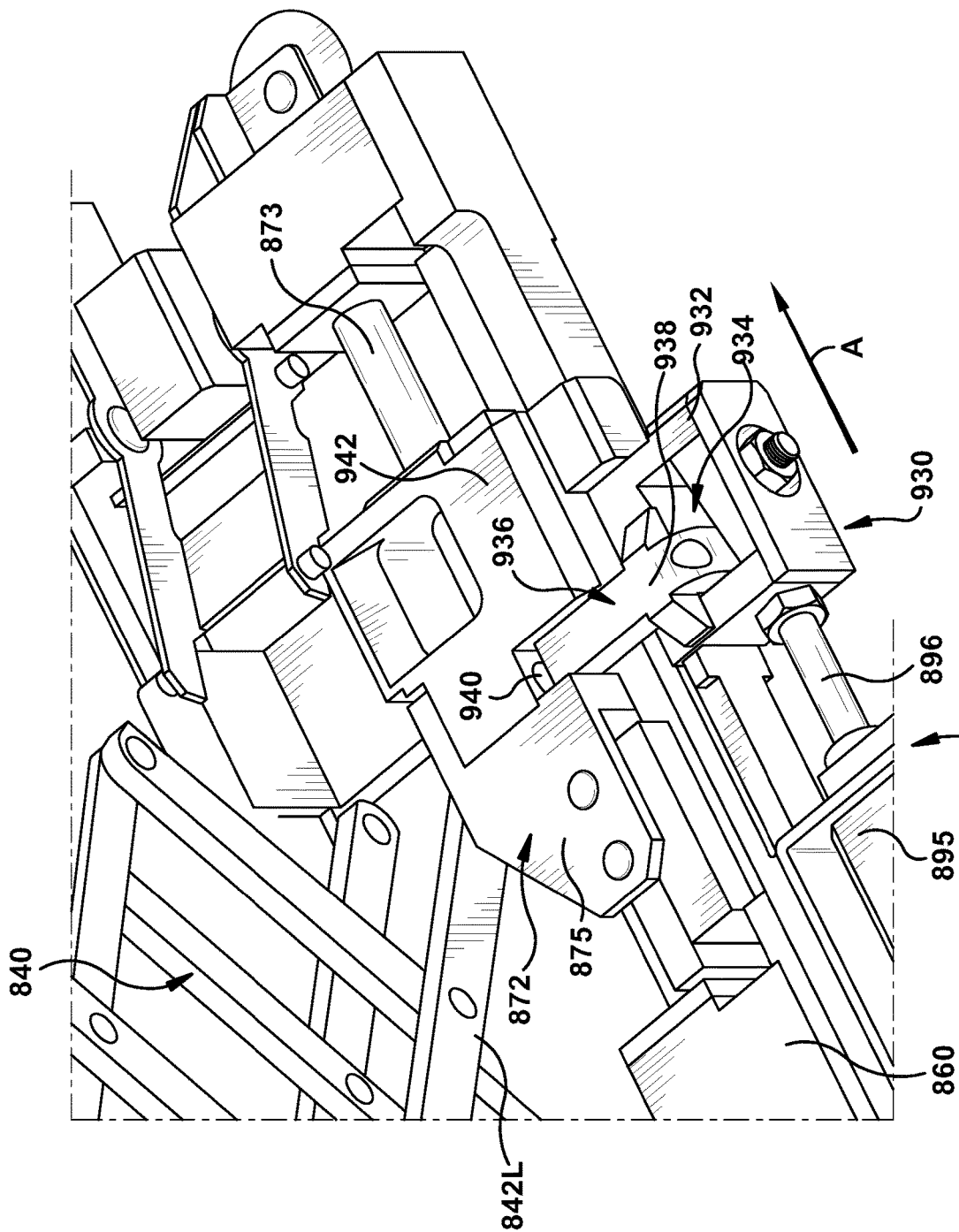
FIG. 30 shows an enlarged perspective view of the emergency release of FIG. 28 in an initially released position.
Figure 31:
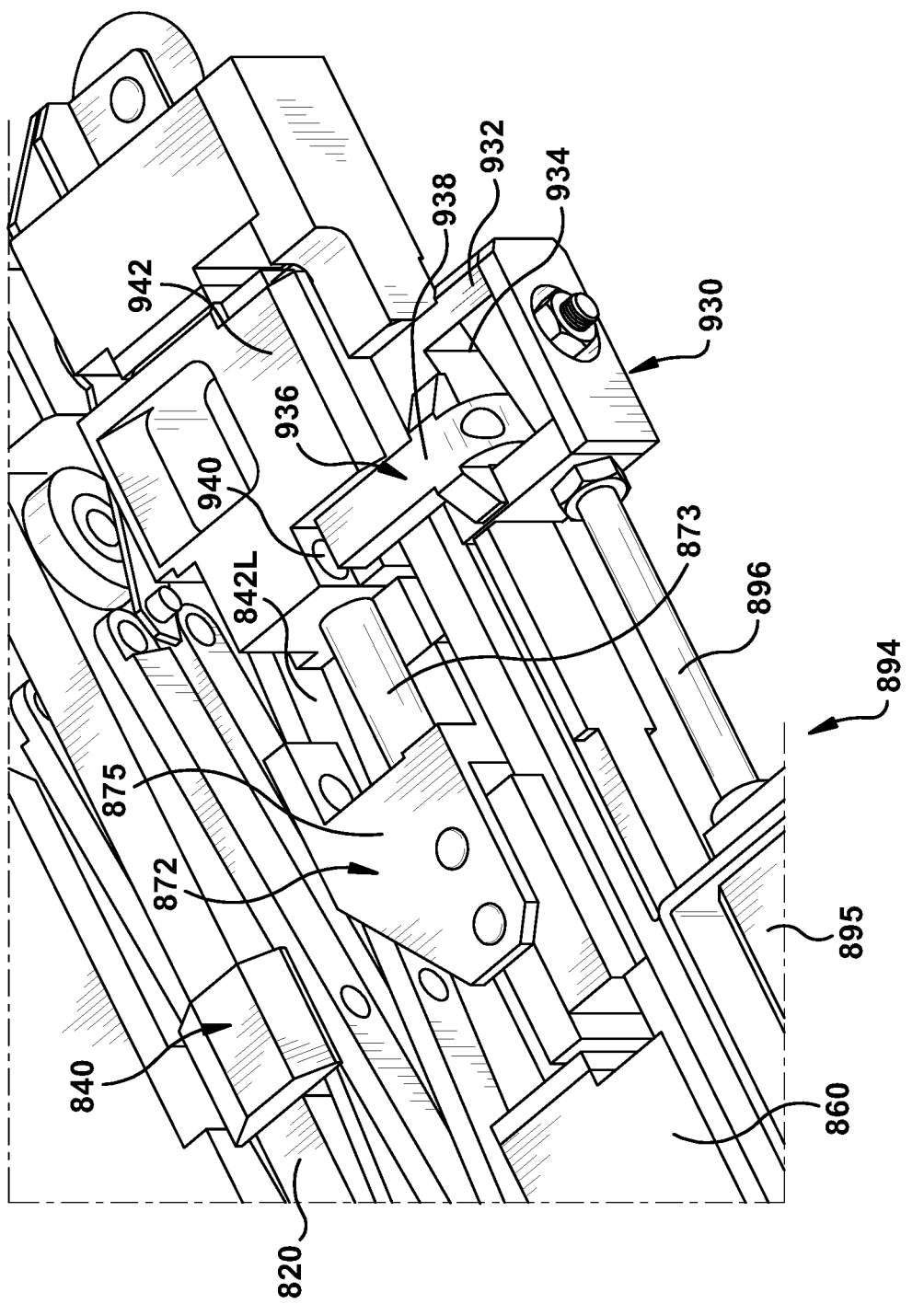
FIG. 31 shows an enlarged perspective view of the emergency release of FIG. 28 in a fully released position.

Referring to the perspective view of FIG. 28 and the enlarged perspective views of FIGS. 29-31, in another embodiment, emergency release 894 may include a pneumatically actuated system including a pneumatic cylinder 895 that may be pressurized by a pneumatic line (not shown, but following tether 132 (FIG. 1)) to release scissor lift 840, i.e., allow it to move quickly to a collapsed position (FIG. 31). In a non-released position, shown in FIG. 29, piston 896 of pneumatic cylinder 895 moves with a link coupling holder 930 that moves with transmission 872, e.g., with a lead screw 873 controlled by motor 860 that extends and retracts scissor lift 840. That is, piston 896 is free to move with link coupling holder 930. Link coupling holder 930 includes an activation body 932 having a sloped opening 934 therein, and a release pin 936. Release pin 936 includes a first end 938 slidingly received in sloped opening 934 of activation body and a second end 940 (FIGS. 30, 31). In a non-released position, shown in FIGS. 28 and 29, a link coupling body 942 that is coupled to lowermost support 842L of scissor lift 840 is coupled to transmission 872 by second end 940 (hidden) of release pin 936. In this example, transmission 872 includes lead screw 873 that turns via motor 860 to move a transmission member 875, i.e., transmission member 875 is driven by lead screw 873. Transmission member 875 is engaged by second end 940 of release pin 936 in the non-released position. Hence, transmission member 875, link coupling body 942 and release pin 936 couple motor 860 and scissor lift 840 together in the non-released position for expansion and retraction of scissor lift 840. Link coupling body 942 is not driven by lead screw 873 and can move independently thereof when not coupled to transmission member 875 by release pin 936. As shown in an initial position in FIG. 30, when pneumatic cylinder 895 is actuated by a pump (not shown, e.g., a hand or electric pump), piston 896 is no longer free to move with transmission 872 and moves linearly forward in the direction of arrow A, which causes sloped opening 934 to force first end 938 of release pin 936 outwardly, e.g., down page as shown in FIG. 30. This action pulls second end 940, now visible in FIG. 30, of release pin 936 from transmission member 875 and releases link coupling body 942 from transmission 872, i.e., transmission member 875. At this point, scissor lift 840 is no longer coupled to transmission 872 and motor 860, and can be forced forward (as shown) to a collapsed position of scissor lift 840 by pressurized pneumatic cylinder 895. As shown in FIG. 31, when pneumatic cylinder 895 is actuated by the pump (not shown, e.g., a hand or electric pump), piston 896 also moves linearly forward in the direction of arrow A to a point at which it moves folding supports 842 and lowermost support 842L to the collapsed position of scissor lift 840. Pneumatic cylinder 895 can be configured to perform the release action quickly to allow for quick collapse of scissor lift 840, and will function regardless of vertical orientation of robotic crawler 110. While particular forms of quick release mechanisms have been illustrated and described, it is understood that a large variety of alternative release mechanisms may be employed.

SIM 800 may be used with a wide variety of sensors 822, some non-limiting examples of which are shown in FIGS.

Figure 25:
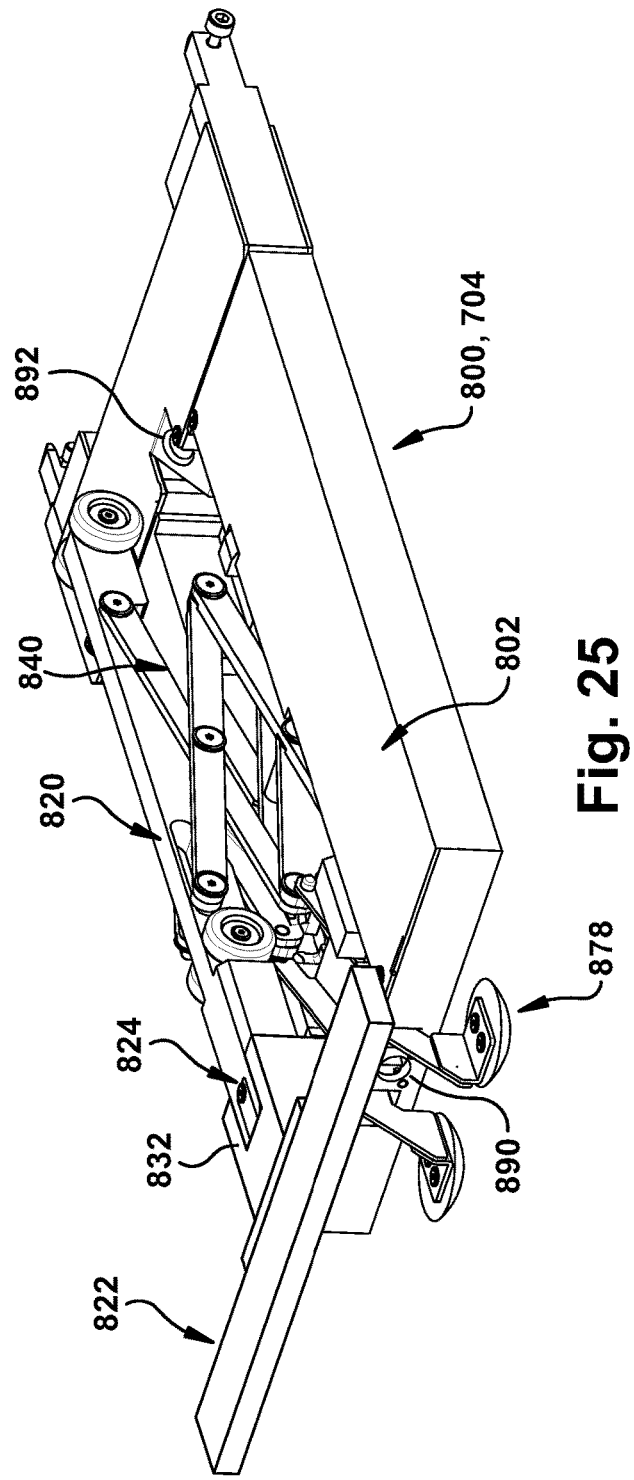
FIG. 25 shows a perspective view of a sensor interface module with another illustrative sensor according to one embodiment of the disclosure.
Figure 26:
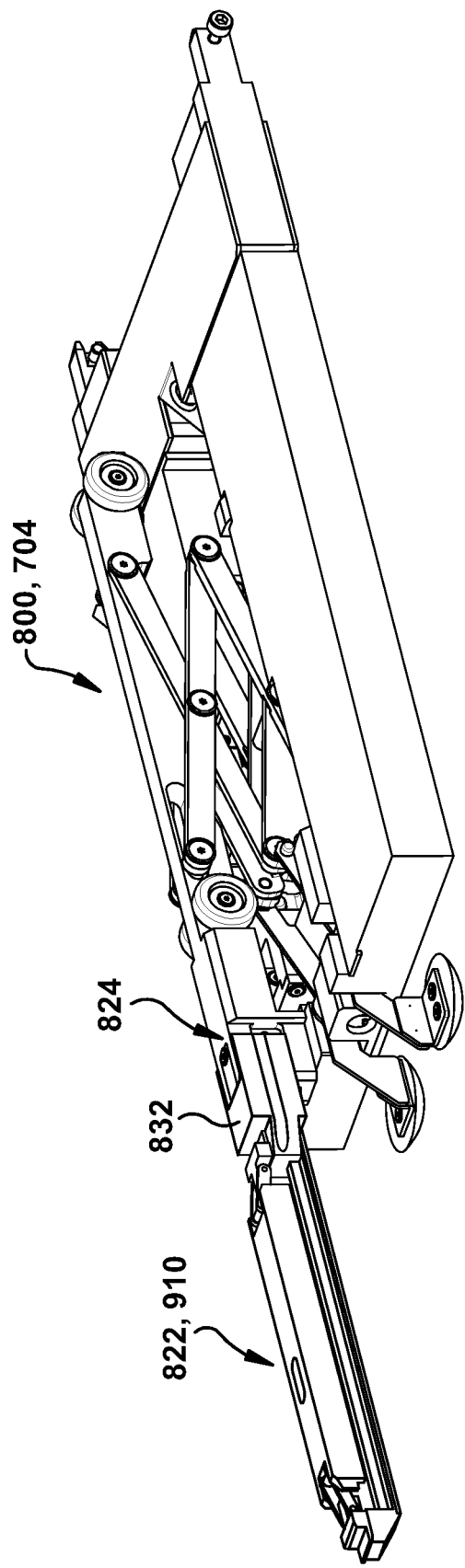
FIG. 26 shows a perspective view of a sensor interface module with yet another illustrative sensor according to one embodiment of the disclosure.

24-27. For example, in FIG. 24, sensor 822 may include an end winding inspection tool 900 including an elongated member 902 and a visual sensor 904, e.g., a camera, coupled to the elongated member. End winding inspection tool 900 may include a connection member 832, as described herein, for mounting with universal connection port 824, i.e., common sensor connection port 826 and electrical connection element 828, on sensor mount 820. In another example, as shown in FIGS. 18 and 25, sensor 822 may include an electromagnetic integrity testing module 830, which may include connection member 832 configured to mate with universal connection port 824, i.e., common sensor connection port 826 and electrical connection element 828, on sensor mount 820. In another example, shown in FIG. 26, sensor 822 may include a wedge tightness assessment module 910, which includes connection member 832 configured to mate with universal connection port 824, i.e., common sensor connection port 826 and electrical connection element 828, on sensor mount 820. Connection members 832 for each sensor 822 may vary depending on the sensor. For example, connection member 832 in FIGS. 18 and 25 are different. In another example, shown in FIG. 27, sensor 822 may include a VIM 790 (similar to that shown in FIG. 15), which includes a connection member 832 configured to mate a module housing 702 thereof with universal connection port 824, i.e., common sensor connection port 826 and electrical connection element 828, on sensor mount 820. Connection members 832 for each sensor 822 may vary depending on the sensor. For example, connection member 832 in FIGS. 18 and 25 are different.

SIM 800 allows use of a wide variety of different sensors 822 with a single sensor interface. In addition, sensor mount 820 and sensor 822 can be made with a sufficiently thin circumferential profile to allow entry into the annular gap, while SIM 800 allows selective positioning of each sensor 822 and can accommodate a wide variety of radial positions or heights. That is, SIM 800 can position each sensor 822 in any required radial position. For example, wedge tightness assessment module 910 (FIG. 26) may require sensor mount 820 to position the module in direct or near direct contact with a wedge in the stator of a generator, i.e., part of surface 234. In other instances, sensor 822 may include a visual inspection module, similar to VIM 790 described herein, with dual view path visual sensors that are spaced away from surfaces 234, 236. SIM 800 also allows sensor mount 820 and a sensor 822 connected thereto to extend into radially extending gaps in surface 234 or 236. Sensors 822 may provide test data back to robotic crawler 110 or control system 150 (FIG. 1). SIM 800 may be a terminal module because it does not include a sensor interface for receiving another sensor module.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The invention claimed is:

1. A visual inspection module for a robot, the visual inspection module comprising:
   a module housing;
   a mounting interface coupled to the module housing for mounting the module housing to a body frame of the robot;
   an inspection unit for simultaneously visually inspecting a first surface facing a first direction and a spaced, second surface facing an opposing, second direction toward the first surface, the inspection unit including:
      a first visual sensor and a second visual sensor, each visual sensor facing in a third direction different than the first and second directions,
      a first reflector configured to reflect an image of the first surface to the first visual sensor, and
      a second reflector configured to reflect an image of the second surface to the second visual sensor; and
   a lifting system configured to adjust a position of the inspection unit relative to the module housing and between the first and second surfaces, wherein the lifting system includes a pair of arms each pivotally coupled to the inspection unit at a respective first end of each arm of the pair of arms, the pair of arms are each pivotally coupled to the module housing at a respective second end of each arm of the pair of arms, and the lifting system includes a motor to pivot at least one arm of the pair of arms to adjust the position of the inspection unit.

2. The visual inspection module of claim 1, wherein:
   the first visual sensor includes a pair of first visual sensors and the first reflector includes a pair of first reflectors, one first reflector for each first visual sensor; and
   the second visual sensor includes a pair of second visual sensors and the second reflector includes a pair of second reflectors, one second reflector for each second visual sensor,
   wherein the third direction faces a forward path of movement of the robot, the first direction 1s substantially perpendicular to the third direction and the second direction is substantially perpendicular to the third direction.

3. The visual inspection module of claim 2, wherein each first reflector is angled at approximately 45° relative to the third direction and towards the first surface, and each second reflector is angled at approximately 45° relative to the third direction and towards the second surface.

4. The visual inspection module of claim 2, wherein a sight line of the pair of first visual sensors overlap, and a sight line of the pair of second visual sensors overlap.

5. The visual inspection module of claim 1, wherein a first arm of the pair of arms is axially offset from a second arm of the pair of arms relative to the inspection unit and the module housing, creating a parallelogram configuration in which rotation of one of the first arm or the second arm causes the other of the first arm or the second arm to follow while remaining parallel thereto, thereby maintaining the inspection unit substantially parallel to the first and second surfaces.

6. A visual inspection module for a robot, the visual inspection module comprising:
 a module housing;
 a mounting interface coupled to the module housing for mounting the module housing to a body frame of the robot;
 an inspection unit for simultaneously visually inspecting a first surface facing a first direction and a spaced, second surface facing an opposing, second direction toward the first surface, the inspection unit including:
  a first visual sensor and a second visual sensor, each visual sensor facing in a third direction different than the first and second directions,
  a first reflector configured to reflect an image of the first surface to the first visual sensor, and
  a second reflector configured to reflect an image of the second surface to the second visual sensor;
 a sensor interface module configured to adjust a position of the inspection unit between the first and second surfaces, the sensor interface module including:
 a sensor mount including a common sensor connection port configured to connect the inspection unit as a selected one of a plurality of different sensors to the sensor mount, the inspection unit and each other sensor including a connection member configured to mate with the common sensor connection port on the sensor mount;
 a scissor lift for maintaining the sensor mount substantially parallel to the first and second surfaces; and,
 a motor configured to move the scissor lift between an expanded position and a retracted position to adjust a position of the inspection unit between the first and second surfaces.

7. A robot system, comprising:
 a robotic crawler;
 a sensor interface module for a robot, the sensor interface module comprising:
  a sensor mount including a common sensor connection port configured to connect a selected one of a plurality of different sensors to the sensor mount, each sensor including a connection member configured to mate with the common sensor connection port on the sensor mount;
  a scissor lift for maintaining the sensor mount substantially parallel to first and second surfaces, a first surface facing a first direction and a spaced, second surface facing an opposing, second direction toward the first surface;
  a module housing supporting the scissor lift; and,
  a motorized transmission coupled to the module housing and to the scissor lift, wherein the motorized transmission is configured to move the scissor lift between an expanded position extending from the module housing, and a retracted position within the module housing.

8. The robot system of claim 7, wherein the common sensor connection port and the connection member of each sensor include mating mechanical mounting elements for mechanically coupling the sensor to the sensor mount, and mating electrical connection elements for electrically connecting the sensor through the sensor mount to the robot.

9. The robot system of claim 7, wherein the module housing includes a retractable slider movable between a surface engaging position in which a foot of the retractable slider engages one of the first and second surfaces for supporting the module housing in response to the scissor lift being in the expanded position from the module housing, and a retracted position in which the foot is disengaged from the one of the first and second surfaces in response to the scissor lift being in a retracted position within the module housing.

10. The robot system of claim 7, further comprising a navigation camera coupled to the module housing, the navigation camera facing toward a forward path of movement of the robot.

11. The robot system of claim 10, further comprising a positioning camera having sight line towards the sensor mount.

12. The robot system of claim 7, further comprising an emergency release to retract the scissor lift without the motor.

* * * * *